United States Patent
Rusanovskyy et al.

(10) Patent No.: US 10,863,170 B2
(45) Date of Patent: Dec. 8, 2020

(54) APPARATUS, A METHOD AND A COMPUTER PROGRAM FOR VIDEO CODING AND DECODING ON THE BASIS OF A MOTION VECTOR

(71) Applicant: Nokia Technologies Oy, Espoo (FI)

(72) Inventors: Dmytro Rusanovskyy, Lempaala (FI); Miska Matias Hannuksela, Tampere (FI); Jani Lainema, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 213 days.

(21) Appl. No.: 13/863,835

(22) Filed: Apr. 16, 2013

(65) Prior Publication Data
US 2014/0133567 A1    May 15, 2014

Related U.S. Application Data

(60) Provisional application No. 61/624,902, filed on Apr. 16, 2012.

(51) Int. Cl.
| | |
|---|---|
| *H04N 19/51* | (2014.01) |
| *H04N 19/102* | (2014.01) |
| *H04N 19/176* | (2014.01) |
| *H04N 19/597* | (2014.01) |
| *H04N 19/13* | (2014.01) |

(Continued)

(52) U.S. Cl.
CPC ........ *H04N 19/102* (2014.11); *H04N 19/105* (2014.11); *H04N 19/13* (2014.11);
(Continued)

(58) Field of Classification Search
CPC ............ H04N 19/00684; H04N 19/13; H04N 19/159; H04N 19/176; H04N 19/513; H04N 19/517; H04N 19/597; H04N 19/70
(Continued)

(56) References Cited

U.S. PATENT DOCUMENTS

| | | | |
|---|---|---|---|
| 7,555,043 B2 * | 6/2009 | Sato ..................... | H04N 19/176 375/240.16 |
| 8,385,427 B2 * | 2/2013 | Bhattacharya ....... | H04N 19/159 375/240.16 |

(Continued)

FOREIGN PATENT DOCUMENTS

| | | |
|---|---|---|
| JP | H09261653 U | 10/1997 |
| WO | WO 2008/051041 A1 | 5/2008 |
| WO | WO 2013/129878 A1 | 9/2013 |

OTHER PUBLICATIONS

International Search Report and Written Opinion received for corresponding Patent Cooperation Treaty Application No. PCT/FI2013/050418, dated Aug. 28, 2013, 17 pages.

(Continued)

*Primary Examiner* — Joon Kwon
(74) *Attorney, Agent, or Firm* — Alston & Bird LLP

(57) ABSTRACT

Methods, apparatus and computer program products are provided in which a set of valid motion vector values for encoding and decoding may depend on a reference picture used. A current block of a frame is selected for encoding, and a reference block for the current block is selected. On the basis of the selected reference block a reference type is determined. On the basis of the reference type and the reference block a motion vector for the current block is determined. Motion vector information is encoded and decoded on the basis of the determined motion vector.

18 Claims, 7 Drawing Sheets

US 10,863,170 B2

Page 2

(51) Int. Cl.
*H04N 19/517* (2014.01)
*H04N 19/513* (2014.01)
*H04N 19/159* (2014.01)
*H04N 19/105* (2014.01)
*H04N 19/30* (2014.01)
*H04N 19/573* (2014.01)
*H04N 19/70* (2014.01)

(52) U.S. Cl.
CPC ......... *H04N 19/159* (2014.11); *H04N 19/176* (2014.11); *H04N 19/30* (2014.11); *H04N 19/513* (2014.11); *H04N 19/517* (2014.11); *H04N 19/573* (2014.11); *H04N 19/597* (2014.11); *H04N 19/70* (2014.11)

(58) Field of Classification Search
USPC ................................................. 375/240.16
See application file for complete search history.

(56) References Cited

U.S. PATENT DOCUMENTS

| | | | | |
|---|---|---|---|---|
| 8,582,659 | B2* | 11/2013 | Crinon | H04N 19/159 |
| | | | | 375/240 |
| 9,131,247 | B2* | 9/2015 | Yin | H04N 19/597 |
| 9,237,355 | B2* | 1/2016 | Chien | H04N 19/52 |
| 2002/0118743 | A1* | 8/2002 | Jiang | H04N 19/29 |
| | | | | 375/240.01 |
| 2004/0146105 | A1* | 7/2004 | Hagai | H04N 19/00 |
| | | | | 375/240.12 |
| 2005/0058205 | A1 | 3/2005 | Holcomb et al. | |
| 2005/0129116 | A1* | 6/2005 | Jeon | H04N 19/117 |
| | | | | 375/240.15 |
| 2008/0002051 | A1* | 1/2008 | Sato | G06T 7/2013 |
| | | | | 348/416.1 |
| 2008/0225952 | A1* | 9/2008 | Wang | H04N 19/105 |
| | | | | 375/240.16 |
| 2008/0253459 | A1 | 10/2008 | Ugur et al. | |
| 2009/0080535 | A1* | 3/2009 | Yin | H04N 19/63 |
| | | | | 375/240.26 |
| 2009/0110080 | A1 | 4/2009 | Soh et al. | |
| 2009/0225846 | A1* | 9/2009 | Francois | H04N 19/52 |
| | | | | 375/240.16 |
| 2009/0238278 | A1 | 9/2009 | Mauchly et al. | |
| 2010/0150236 | A1* | 6/2010 | Koo | H04N 19/597 |
| | | | | 375/240.12 |
| 2010/0166074 | A1* | 7/2010 | Ho | H04N 13/0059 |
| | | | | 375/240.16 |
| 2010/0290527 | A1 | 11/2010 | Park et al. | |
| 2011/0170602 | A1 | 7/2011 | Lee et al. | |
| 2011/0293010 | A1 | 12/2011 | Jeong et al. | |
| 2012/0044322 | A1* | 2/2012 | Tian | H04N 19/597 |
| | | | | 348/43 |
| 2012/0075436 | A1* | 3/2012 | Chen | H04N 13/161 |
| | | | | 348/51 |
| 2012/0189062 | A1* | 7/2012 | Sugio | H04N 19/176 |
| | | | | 375/240.16 |
| 2012/0269267 | A1* | 10/2012 | Choi | H04N 19/597 |
| | | | | 375/240.13 |
| 2013/0002816 | A1* | 1/2013 | Hannuksela | G06T 9/00 |
| | | | | 348/43 |
| 2013/0163668 | A1* | 6/2013 | Chen | H04N 19/197 |
| | | | | 375/240.14 |
| 2013/0176389 | A1* | 7/2013 | Chen | H04N 19/597 |
| | | | | 348/43 |
| 2014/0016701 | A1* | 1/2014 | Chen | H04N 19/00575 |
| | | | | 375/240.14 |
| 2014/0037007 | A1* | 2/2014 | Lee | H04N 19/597 |
| | | | | 375/240.16 |
| 2014/0205021 | A1* | 7/2014 | Hannuksela | H04N 19/30 |
| | | | | 375/240.26 |
| 2014/0286433 | A1* | 9/2014 | He | H04N 19/00696 |
| | | | | 375/240.16 |
| 2014/0341273 | A1* | 11/2014 | Ye | H04N 19/36 |
| | | | | 375/240.02 |
| 2015/0016519 | A1* | 1/2015 | Xu | H04N 19/105 |
| | | | | 375/240.12 |
| 2015/0071356 | A1* | 3/2015 | Kim | H04N 19/513 |
| | | | | 375/240.16 |

OTHER PUBLICATIONS

Office Action and Search Report for Chinese Patent Application No. 2013800318592 dated Feb. 17, 2017, with English translation, 11 pages.
Supplementary European Search Report for Application No. EP 13 77 8734 dated Aug. 26, 2016
Bici, O. et al., *AHG10: Hook for Scalable Extensions: Signalling TMVP Reference Index in Slice Header*, Joint Collaborative Team on Video Coding (JCT-VC) of ITU-T SG 16 WP 3 and ISO/IEC JTC 1/SC 29/WG 11 (JCTVC J0244) (Jul. 2012) 6 pages.
Choi, H. et al., *Scalable Structures and Inter-Layer Predictions for HEVC Scalable Extension*, Joint Collaborative Team on Video Coding (JCT-VC) of ITU-T SG 16 WP3 and ISO/IEC JTC1/SC29/WG11 (JCTVC-F096) (Jul. 2011) 11 pages.
Hannuksela, M. M. et al., *Hook for Scalable Extensions: Conditional Presence of Motion Vector Difference*, Joint Collaborative Team on Video Coding (JCT-VC) of ITU-T SG 16 WP 3 and ISO/IEC JTC 1/SC 29/WG 11 (JCTVC 10068) (Apr.-May 2012) 3 pages.
Kim, Y. et al., *Efficient Disparity Vector Coding for Multiview Sequences*, Signal Processing: Image Communication 19 (2004) 539-553.
Lee, S-H. et al., *Disparity Vector Prediction in MVC*, Joint Video Team (JVT) of ISO/IEC MPEG & ITU-T VCEG (ISO/IEC JTC1/SC29/WG11 and ITU-T SG16 Q.6) (JVT-W104) (Apr. 2007) 7 pages.
Schwarz, H. et al., *Constrained Inter-Layer Prediction for Single-Loop Decoding in Spatial Scalability*, ICIP 2005, IEEE International Conference on Image Processing, vol. 2 (Sep. 2005) 4 pages.
Schwarz, H. et al., *Overview of the Scalable H.264/MPEG4-AVC Extension*, 2006 IEEE International Conference on Image Processing (Oct. 2006) 161-164.
Takahashi, Y. et al., *Descriptions of 3D Video Coding Proposal (HEVC-Compatible Category)*, ISO/IEC JTC1/SC29/WG11 MPEG2011/M22566, International Organisation for Standardisation Organisation Internationale de Normalisation ISO/IEC JTC1/SC29/WG11 Coding of Moving Pictures and Audio (Nov. 2011) 36 pages.
Tian, D. et al., *3D-AVC-CE1 Results on VSP Skip/Direct Mode by Mitsubishi*, ISO/IEC JTC1/SC29/WG11 MPEG2011/M23915, International Organisation for Standardisation Organisation Internationale de Normalisation ISO/IEC JTC1/SC29/WG11 Coding of Moving Pictures and Audio (Feb. 2012) 4 pages.
Yea, S. et al., *CE3: MVC View Synthesis Prediction*, Joint Video Team (JVT) of ISO/IEC MPEG & ITU-T VCEG (ISO/IEC JTC1/SC29/WG11 and ITU-T SG16 Q.6) (JVT-X073) (Jun.-Jun. 2007) 9 pages.
Yu, Y. et al., *3D-CE1.a Related: Generalized View Synthesis Prediction (GVSP) Mode*, ISO/IEC JTC1/SC29/WG11 MPEG2012/m24940, International Organisation for Standardisation Organisation Internationale de Normalisation ISO/IEC JTC1/SC29/WG11 Coding Of Moving Pictures and Audio (April-May 2012) 6 pages.
Smolic, A. et al., *3D Video and Free Viewpoint Video—Technologies, Applicants and MPEP Standards*, IEEE (2006) 2161-2164.
Vetro, A. et al., *Towards a 3D Video Format for Auto-Stereoscopic Display*, Mitsubishi Electric Research Laboratories, TR2008-057 (Sep. 2008) 11 pages.
Office Action for Chinese Patent Application No. 2013800318592 dated Jul. 18, 2018, with English translation, 9 pages.
Office Action for Chinese Patent Application No. 2013800318592 dated Dec. 13, 2018, 7 pages.
Office Action for European Patent Application No. 13778734.7 dated Apr. 23, 2019, 9 pages.

(56) References Cited

OTHER PUBLICATIONS

Puri et al, Basics of stereoscopic video, new compression results with MPEG-2 and a proposal for MPEF-4, article, online], 1997, [retrieved May 22, 2019], retrieved from the Internet <URL: https://www.sciencedirect.com/science/article/abs/pii/S0923596597000258> pp. 201-234.

Text of ISO/IEC 14496-10:200X/FDAM 1 Multiview Video Coding, MPEG Meeting; 2008, Jul. 21, 2008-Jul. 25, 2008; Hannover; (Motion Picture Expert Group or ISO/IEC JTC1/SC29/WG11), No. N9978, 69 pages.

Summons to Attend Oral Proceedings for European Application No. 13 778 734.7 dated Oct. 29, 2019, 11 pages.

Office Action and Search Report for Chinese Patent Application No. 2013800318592 dated Jan. 2, 2018, with English translation, 10 pages.

Office Action for Indian Patent Application No. 8074/CHENP/2014 dated Jun. 14 , 2019, 8 pages.

\* cited by examiner

APPARATUS, A METHOD AND A COMPUTER PROGRAM FOR VIDEO CODING AND DECODING ON THE BASIS OF A MOTION VECTOR

TECHNICAL FIELD

The present invention relates to an apparatus, a method and a computer program for video coding and decoding.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Scalable video coding refers to a coding structure where one bitstream can contain multiple representations of the content at different bitrates, resolutions, frame rates and/or other types of scalability. A scalable bitstream may consist of a base layer providing the lowest quality video available and one or more enhancement layers that enhance the video quality when received and decoded together with the lower layers. In order to improve coding efficiency for the enhancement layers, the coded representation of that layer may depend on the lower layers. Each layer together with all its dependent layers is one representation of the video signal at a certain spatial resolution, temporal resolution, quality level, and/or operation point of other types of scalability.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard H.264/AVC or the Multiview Video Coding MVC extension of H.264/AVC can be used.

SUMMARY

Some embodiments utilize the consideration that a set of valid motion vector values for encoding and decoding may depend on the reference picture used. In some cases (e.g. for particular types of reference pictures), the set of valid motion vector component values may be empty, in which case the encoding of syntax element(s) related to the motion vector component may be omitted and the value of the motion vector component may be derived in the decoding. In some cases, the set of valid motion vector component values may be smaller than a normal set of motion vector values for inter prediction, in which case the entropy coding for the motion vector differences may be changed e.g. by using a different context-adaptive binary arithmetic coding (CABAC) context for these motion vector differences than the context for other inter prediction motion vectors. In some cases, the likelihood of motion vector values may depend more heavily on the reference picture than on the neighboring motion vectors (e.g. spatially or temporally) and hence entropy coding may differ from that used for other motion vectors, e.g. a different initial CABAC context may be used or a different context may be maintained and adapted e.g. based on the type of the reference picture.

Some embodiments provide a mechanism to indicate when the motion vector information is combined with the indication of the reference picture index. In these cases the decoder may first decode indication about the reference index associated with the prediction unit. If that reference index points into a picture with indicated special motion vector field, the motion vector prediction and differential motion vector decoding processes may be entirely or partly bypassed and/or the context-based entropy decoding process may differ from that of other motion vectors. Furthermore, if differential motion vector coding has been entirely or partly bypassed, a motion vector may be derived with a special process for the prediction unit.

In some embodiments motion vector components utilized for view synthesis based prediction, inter-view prediction, and inter-layer prediction may be restricted in their applicability range, which define set of syntax elements and set of decoding operations.

According to a first aspect of the invention, there is provided a method comprising: selecting a current block of a frame for encoding;
selecting a reference block for the current block;
determining a reference type on the basis of the selected reference block;
determining a motion vector for the current block on the basis of the reference type and the reference block; and
encoding motion vector information on the basis of the determined motion vector.

According to a second aspect of the invention, there is provided a method comprising:
selecting a current block of a frame for encoding;
selecting a reference block for the current block;
determining a reference picture index identifying the picture the reference block belongs to;
determining a motion vector for the current block on the basis of the reference picture index; and
encoding motion vector information on the basis of the determined motion vector.

According to a third aspect of the invention, there is provided an apparatus comprising at least one processor and at least one memory including computer program code, the at least one memory and the computer program code configured to, with the at least one processor, cause the apparatus to:
select a current block of a frame for encoding;
select a reference block for the current block;
determine a reference type on the basis of the selected reference block;
determine a motion vector for the current block on the basis of the reference type and the reference block; and encode motion vector information on the basis of the determined motion vector.

According to a fourth aspect of the invention, there is provided an apparatus comprising at least one processor and at least one memory including computer program code, the at least one memory and the computer program code configured to, with the at least one processor, cause the apparatus to:
 select a current block of a frame for encoding;
 select a reference block for the current block;
 determine a reference picture index identifying the picture the reference block belongs to;
 determine a motion vector for the current block on the basis of the reference picture index; and
 encode motion vector information on the basis of the determined motion vector.

According to a fifth aspect of the invention, there is provided a computer
 program product including one or more sequences of one or more instructions which, when executed by one or more processors, cause an apparatus to at least perform the following:
 select a current block of a frame for encoding;
 select a reference block for the current block;
 determine a reference type on the basis of the selected reference block;
 determine a motion vector for the current block on the basis of the reference type and the reference block; and
 encode motion vector information on the basis of the determined motion vector.

According to a sixth aspect of the invention, there is provided a computer
 program product including one or more sequences of one or more instructions which, when executed by one or more processors, cause an apparatus to at least perform the following:
 select a current block of a frame for encoding;
 select a reference block for the current block;
 determine a reference picture index identifying the picture the reference block belongs to;
 determine a motion vector for the current block on the basis of the reference picture index; and
 encode motion vector information on the basis of the determined motion vector.

According to a seventh aspect of the invention there is provided an apparatus comprising:
 means for selecting a current block of a frame for encoding;
 means for selecting a reference block for the current block;
 means for determining a reference type on the basis of the selected reference block;
 means for determining a motion vector for the current block on the basis of the reference type and the reference block; and
 means for encoding motion vector information on the basis of the determined motion vector.

According to an eighth aspect of the invention there is provided an apparatus comprising:
 means for selecting a current block of a frame for encoding;
 means for selecting a reference block for the current block;
 means for determining a reference picture index identifying the picture the reference block belongs to;
 means for determining a motion vector for the current block on the basis of the reference picture index; and
 means for encoding motion vector information on the basis of the determined motion vector.

According to a ninth aspect of the invention, there is provided a method comprising:
 receiving a bit stream comprising encoded information relating to a current block of a frame;
 decoding the encoded information;
 examining the received information to determine whether the decoded information contains indication of a reference type for the current block;
 if so, using the reference type to determine how to obtain motion vector information relating to the current block; and
 obtaining the motion vector information.

According to a tenth aspect of the invention, there is provided a method comprising:
 receiving a bit stream comprising encoded information relating to a current block of a frame;
 decoding the encoded information;
 examining the received information to determine whether the decoded information contains indication of a reference picture index identifying the picture the reference block belongs to;
 if so, using the reference picture index to determine how to obtain motion vector information relating to the current block; and
 obtaining the motion vector information.

According to an eleventh aspect of the invention, there is provided an apparatus comprising at least one processor and at least one memory including computer program code, the at least one memory and the computer program code configured to, with the at least one processor, cause the apparatus to:
 receive a bit stream comprising encoded information relating to a current block of a frame;
 decode the encoded information;
 examine the received information to determine whether the decoded information contains indication of a reference type for the current block;
 if so, use the reference type to determine how to obtain motion vector information relating to the current block; and
 obtain the motion vector information.

According to a twelfth aspect of the invention, there is provided an apparatus comprising at least one processor and at least one memory including computer program code, the at least one memory and the computer program code configured to, with the at least one processor, cause the apparatus to:
 receive a bit stream comprising encoded information relating to a current block of a frame;
 decode the encoded information;
 examine the received information to determine whether the decoded information contains indication of a reference picture index identifying the picture the reference block belongs to;
 if so, use the reference picture index to determine how to obtain motion vector information relating to the current block; and
 obtain the motion vector information.

According to a thirteenth aspect of the invention, there is provided a computer program product including one or more sequences of one or more instructions which, when executed by one or more processors, cause an apparatus to at least perform the following:
 receive a bit stream comprising encoded information relating to a current block of a frame;

decode the encoded information;

examine the received information to determine whether the decoded information contains indication of a reference type for the current block;

if so, use the reference type to determine how to obtain motion vector information relating to the current block; and obtain the motion vector information.

According to a fourteenth aspect of the invention, there is provided a computer program product including one or more sequences of one or more instructions which, when executed by one or more processors, cause an apparatus to at least perform the following:

receive a bit stream comprising encoded information relating to a current block of a frame;

decode the encoded information;

examine the received information to determine whether the decoded information contains indication of a reference picture index identifying the picture the reference block belongs to;

if so, use the reference picture index to determine how to obtain motion vector information relating to the current block; and obtain the motion vector information.

According to a fifteenth aspect of the invention, there is provided an apparatus comprising:

means for receiving a bit stream comprising encoded information relating to a current block of a frame;

means for decoding the encoded information;

means for examining the received information to determine whether the decoded information contains indication of a reference type for the current block;

means for using the reference type to determine how to obtain motion vector information relating to the current block, if the encoded information contains indication of a reference type for the current block; and means for obtaining the motion vector information.

According to a sixteenth aspect of the invention, there is provided an apparatus comprising:

means for receiving a bit stream comprising encoded information relating to a current block of a frame;

means for decoding the encoded information;

means for examining the received information to determine whether the decoded information contains indication of a reference picture index identifying the picture the reference block belongs to;

means for using the reference picture index to determine how to obtain motion vector information relating to the current block, if the encoded information contains indication of a reference type for the current block; and means for obtaining the motion vector information.

According to a seventeenth aspect of the invention, there is provided a video coder configured for:

selecting a current block of a frame for encoding;

selecting a reference block for the current block;

determining a reference type on the basis of the selected reference block;

determining a motion vector for the current block on the basis of the reference type and the reference block; and encoding motion vector information on the basis of the determined motion vector.

According to an eighteenth aspect of the invention, there is provided a video coder configured for:

selecting a current block of a frame for encoding;

selecting a reference block for the current block;

determining a reference picture index identifying the picture the reference block belongs to;

determining a motion vector for the current block on the basis of the reference picture index; and encoding motion vector information on the basis of the determined motion vector.

According to a nineteenth aspect of the invention, there is provided a video decoder configured for:

receiving a bit stream comprising encoded information relating to a current block of a frame;

decoding the encoded information;

examining the received information to determine whether the decoded information contains indication of a reference type for the current block;

if so, using the reference type to determine how to obtain motion vector information relating to the current block; and obtaining the motion vector information.

According to a twentieth aspect of the invention, there is provided a video decoder configured for:

receiving a bit stream comprising encoded information relating to a current block of a frame;

decoding the encoded information;

examining the received information to determine whether the decoded information contains indication of a reference picture index identifying the picture the reference block belongs to;

if so, using the reference picture index to determine how to obtain motion vector information relating to the current block; and obtaining the motion vector information.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
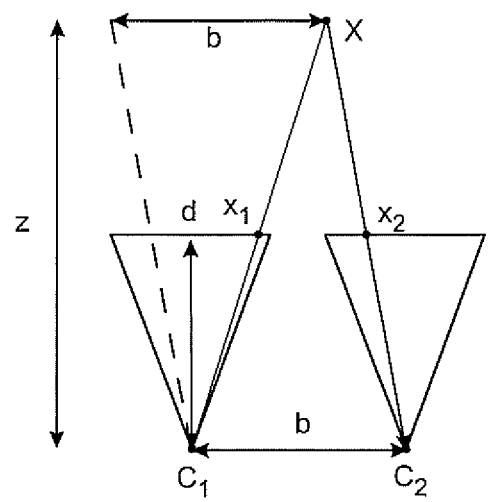
FIG. 1 shows a simplified 2D model of a stereoscopic camera setup.

In order to understand the various aspects of the invention and the embodiments related thereto, the following describes briefly some closely related aspects of video coding.

Some key definitions, bitstream and coding structures, and concepts of H.264/AVC are described in this section as an example of a video encoder, decoder, encoding method, decoding method, and a bitstream structure, wherein some embodiments may be implemented. The aspects of the invention are not limited to H.264/AVC, but rather the description is given for one possible basis on top of which the invention may be partly or fully realized.

The H.264/AVC standard was developed by the Joint Video Team (JVT) of the Video Coding Experts Group (VCEG) of the Telecommunications Standardisation Sector of International Telecommunication Union (ITU-T) and the Moving Picture Experts Group (MPEG) of International Standardisation Organisation (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

Similarly to many earlier video coding standards, the bitstream syntax and semantics as well as the decoding process for error-free bitstreams are specified in H.264/AVC. The encoding process is not specified, but encoders must generate conforming bitstreams. Bitstream and decoder conformance can be verified with the Hypothetical Reference Decoder (HRD), which is specified in Annex C of H.264/AVC. The standard contains coding tools that help in coping with transmission errors and losses, but the use of the tools in encoding is optional and no decoding process has been specified for erroneous bitstreams.

The elementary unit for the input to an H.264/AVC encoder and the output of an H.264/AVC decoder is a picture. A picture may either be a frame or a field. A frame typically comprises a matrix of luma samples and corresponding chroma samples. A field is a set of alternate sample rows of a frame and may be used as encoder input, when the source signal is interlaced. A macroblock (MB) is a 16×16 block of luma samples and the corresponding blocks of chroma samples. A block has boundary samples, which consist of the samples at the top-most and bottom-most rows of samples and at the left-most and right-most columns of samples. Boundary samples adjacent to another block being coded or decoded may be used for example in intra prediction. Chroma pictures may be subsampled when compared to luma pictures. For example, in the 4:2:0 sampling pattern the spatial resolution of chroma pictures is half of that of the luma picture along both coordinate axes and consequently a macroblock contains one 8×8 block of chroma samples per each chroma component. A picture is partitioned to one or more slice groups, and a slice group contains one or more slices. A slice consists of an integer number of macroblocks ordered consecutively in the raster scan within a particular slice group.

The elementary unit for the output of an H.264/AVC encoder and the input of an H.264/AVC decoder is a Network Abstraction Layer (NAL) unit. Decoding of partially lost or corrupted NAL units is typically difficult. For transport over packet-oriented networks or storage into structured files, NAL units are typically encapsulated into packets or similar structures. A bytestream format has been specified in H.264/AVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention is performed always regardless of whether the bytestream format is in use or not.

H.264/AVC, as many other video coding standards, allows splitting of a coded picture into slices. In-picture prediction is disabled across slice boundaries. Thus, slices can be regarded as a way to split a coded picture into independently decodable pieces, and slices are therefore elementary units for transmission.

Some profiles of H.264/AVC enable the use of up to eight slice groups per coded picture. When more than one slice group is in use, the picture is partitioned into slice group map units, which are equal to two vertically consecutive macroblocks when the macroblock-adaptive frame-field (MBAFF) coding is in use and equal to a macroblock otherwise. The picture parameter set contains data based on which each slice group map unit of a picture is associated with a particular slice group. A slice group can contain any slice group map units, including non-adjacent map units. When more than one slice group is specified for a picture, the flexible macroblock ordering (FMO) feature of the standard is used.

In H.264/AVC, a slice consists of one or more consecutive macroblocks (or macroblock pairs, when MBAFF is in use) within a particular slice group in raster scan order. If only one slice group is in use, H.264/AVC slices contain consecutive macroblocks in raster scan order and are therefore similar to the slices in many previous coding standards. In some profiles of H.264/AVC slices of a coded picture may appear in any order relative to each other in the bitstream, which is referred to as the arbitrary slice ordering (ASO) feature. Otherwise, slices must be in raster scan order in the bitstream.

NAL units consist of a header and payload. The NAL unit header indicates the type of the NAL unit and whether a coded slice contained in the NAL unit is a part of a reference picture or a non-reference picture. The header for SVC and MVC NAL units additionally contains various indications related to the scalability and multiview hierarchy.

NAL units of H.264/AVC can be categorized into Video Coding Layer (VCL) NAL units and non-VCL NAL units. VCL NAL units are either coded slice NAL units, coded slice data partition NAL units, or VCL prefix NAL units. Coded slice NAL units contain syntax elements representing one or more coded macroblocks, each of which corresponds to a block of samples in the uncompressed picture. There are four types of coded slice NAL units: coded slice in an Instantaneous Decoding Refresh (IDR) picture, coded slice in a non-IDR picture, coded slice of an auxiliary coded picture (such as an alpha plane) and coded slice extension (for SVC slices not in the base layer or MVC slices not in the base view). A set of three coded slice data partition NAL units contains the same syntax elements as a coded slice. Coded slice data partition A comprises macroblock headers and motion vectors of a slice, while coded slice data partition B and C include the coded residual data for intra macroblocks and inter macroblocks, respectively. It is noted that the support for slice data partitions is only included in some profiles of H.264/AVC. A VCL prefix NAL unit precedes a coded slice of the base layer in SVC and MVC bitstreams and contains indications of the scalability hierarchy of the associated coded slice.

A non-VCL NAL unit of H.264/AVC may be of one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets are essential for the reconstruction of decoded pictures, whereas the other non-VCL NAL units are not necessary for the reconstruction of decoded sample values and serve other purposes presented below.

Many parameters that remain unchanged through a coded video sequence are included in a sequence parameter set. In addition to the parameters that are essential to the decoding process, the sequence parameter set may optionally contain video usability information (VUI), which includes parameters that are important for buffering, picture output timing, rendering, and resource reservation. A picture parameter set contains such parameters that are likely to be unchanged in several coded pictures. No picture header is present in H.264/AVC bitstreams but the frequently changing picture-level data is repeated in each slice header and picture parameter sets carry the remaining picture-level parameters. H.264/AVC syntax allows many instances of sequence and picture parameter sets, and each instance is identified with a unique identifier. Each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data. For example, parameter sets can be included as a parameter in the session description for H.264/AVC Real-time Transport Protocol (RTP) sessions. If parameter sets are transmitted in-band, they can be repeated to improve error robustness.

A SEI NAL unit of H.264/AVC contains one or more SEI messages, which are not required for the decoding of output pictures but assist in related processes, such as picture output timing, rendering, error detection, error concealment, and resource reservation. Several SEI messages are specified in H.264/AVC, and the user data SEI messages enable organizations and companies to specify SEI messages for their own use. H.264/AVC contains the syntax and semantics for the specified SEI messages but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture in H.264/AVC consists of the VCL NAL units that are required for the decoding of the picture. A coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded.

In H.264/AVC, an access unit consists of a primary coded picture and those NAL units that are associated with it. The appearance order of NAL units within an access unit is constrained as follows. An optional access unit delimiter NAL unit may indicate the start of an access unit. It is followed by zero or more SEI NAL units. The coded slices or slice data partitions of the primary coded picture appear next, followed by coded slices for zero or more redundant coded pictures.

As noted above, in scalable video coding, a video signal can be encoded into a base layer and one or more enhancement layers constructed. An enhancement layer may enhance for example the temporal resolution (i.e., the frame rate), the spatial resolution, or simply the quality of the video content represented by another layer or part thereof. Each layer together with all its dependent layers is one representation of the video signal for example at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of an MGS layer. At any temporal location, and with an identical "dependency_id" value, a picture with "quality_id" equal to QL uses the picture with "quality_id" equal to QL-1 for inter-layer prediction.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

Each H.264/AVC VCL NAL unit (with NAL unit type in the scope of 1 to 5) is preceded by a prefix NAL unit in an SVC bitstream. A compliant H.264/AVC decoder implementation ignores prefix NAL units. The prefix NAL unit includes the "temporal_id" value and hence an SVC decoder, that decodes the base layer, can learn from the prefix NAL units the temporal scalability hierarchy. Moreover, the prefix NAL unit includes reference picture marking commands for base representations.

SVC uses the same mechanism as H.264/AVC to provide temporal scalability. Temporal scalability provides refinement of the video quality in the temporal domain, by giving flexibility of adjusting the frame rate. In H.264/AVC, SVC and MVC, temporal scalability can be achieved by using non-reference pictures and/or hierarchical reference picture prediction structures. Using only non-reference pictures is able to achieve similar temporal scalability as using conventional B pictures in MPEG-1/2/4, by discarding non-reference pictures. Hierarchical coding structure can achieve more flexible temporal scalability.

In H.264/AVC, the temporal level may be signaled by the sub-sequence layer number in the sub-sequence information Supplemental Enhancement Information (SEI) messages. In SVC, the temporal level is signaled in the Network Abstraction Layer (NAL) unit header by the syntax element "temporal_id." The bitrate and frame rate information for each temporal level is signaled in the scalability information SEI message.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this causes encoding-decoding mismatch, also referred to as drift, when some FGS data are discarded.

One feature of SVC is that the FGS NAL units can be freely dropped or truncated, and MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency. Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_lx_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

The leaky prediction technique makes use of both base representations and decoded pictures (corresponding to the highest decoded "quality_id"), by predicting FGS data using a weighted combination of the base representations and decoded pictures. The weighting factor can be used to control the attenuation of the potential drift in the enhancement layer pictures. When leaky prediction is used, the FGS feature of the SVC is often referred to as Adaptive Reference FGS (AR-FGS). AR-FGS is a tool to balance between coding efficiency and drift control. AR-FGS enables leaky prediction by slice level signaling and MB level adaptation of weighting factors.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit always results in one decoded picture consisting of one or more decoded view components. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture in MVC is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. A closed GOP is such a group of pictures in which all pictures can be correctly decoded when the decoding starts from the initial intra picture of the closed GOP. In other words, no picture in a closed GOP refers to any pictures in previous GOPs. In H.264/AVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC indicates whether a particular picture is a reference picture for inter prediction of any other picture. Pictures of any coding type (I, P, B) can be reference pictures or non-reference pictures in H.264/AVC. The NAL unit header indicates the type of the NAL unit and whether a coded slice contained in the NAL unit is a part of a reference picture or a non-reference picture.

There is an ongoing video coding standardization project for specifying a High Efficiency Video Coding (HEVC) standard. Many of the key definitions, bitstream and coding structures, and concepts of HEVC are the same as or similar to those of H.264/AVC. Some key definitions, bitstream and coding structures, and concepts of HEVC are described in this section as an example of a video encoder, decoder, encoding method, decoding method, and a bitstream structure, wherein some embodiments may be implemented. The aspects of the invention are not limited to HEVC, but rather the description is given for one possible basis on top of which the invention may be partly or fully realized.

Similarly to H.264/AVC, an HEVC bitstream consists of a number of access units, each including coded data associated with a picture. Each access unit is divided into NAL units, including one or more VCL NAL units (i.e., coded slice NAL units) and zero or more non-VCL NAL units, e.g., parameter set NAL units or Supplemental Enhancement Information (SEI) NAL units. Each NAL unit includes a NAL unit header and a NAL unit payload. In a draft HEVC standard, a two-byte NAL unit header is used for all specified NAL unit types. The first byte of the NAL unit header contains one reserved bit, a one-bit indication nal_ref_idc primarily indicating whether the picture carried in this access unit is a reference picture or a non-reference picture, and a six-bit NAL unit type indication. The second byte of the NAL unit header includes a three-bit temporal_id indication for temporal level and a five-bit reserved field (called reserved_one_5 bits) required to have a value equal to 1 in a draft HEVC standard. The five-bit reserved field is expected to be used by extensions such as a future scalable and 3D video extension. It is expected that these five bits would carry information on the scalability hierarchy, such as quality_id or similar, dependency_id or similar, any other type of layer identifier, view order index or similar, view identifier, an identifier similar to priority_id of SVC indicating a valid sub-bitstream extraction if all NAL units greater than a specific identifier value are removed from the bitstream. Without loss of generality, in some example embodiments a variable LayerId is derived from the value of reserved_one_5 bits for example as follows: LayerId= reserved_one_5 bits−1.

In a draft HEVC standard, some key definitions and concepts for picture partitioning are defined as follows. A partitioning is defined as the division of a set into subsets such that each element of the set is in exactly one of the subsets.

Video pictures can be divided into coding units (CU) covering the area of the picture. A coding unit consists of one or more prediction units (PU) defining the prediction process for the samples within the coding unit and one or more transform units (TU) defining the prediction error coding process for the samples in the coding unit. A coding unit may consist of a square block of samples with a size selectable from a predefined set of possible coding unit sizes. A coding unit with the maximum allowed size may be named as a largest coding unit (LCU) and the video picture may be divided into non-overlapping largest coding units. A largest coding unit can further be split into a combination of smaller coding units, e.g. by recursively splitting the largest coding unit and resultant coding units. Each resulting coding unit may have at least one prediction unit and at least one transform unit associated with it. Each prediction unit and transform unit can further be split into smaller prediction units and transform units in order to increase granularity of the prediction and prediction error coding processes, respectively. Each prediction unit has prediction information associated with it defining what kind of a prediction is to be applied for the pixels within that prediction unit (e.g. motion vector information for inter predicted prediction units and intra prediction directionality information for intra predicted prediction units). Similarly, each transform unit is associated with information describing the prediction error decoding process for the samples within the transform unit (including e.g. DCT coefficient information). It may be signalled at coding unit level whether prediction error coding is applied or not for each coding unit. In the case there is no prediction error residual associated with the coding unit, it can be considered there are no transform units for the coding unit. The division of the image into coding units, and division of coding units into prediction units and transform units may be signalled in a bitstream allowing the decoder to reproduce the intended structure of these units.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may be also referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (e.g. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. H.264/AVC and HEVC, as many other video compression standards, divides a picture into a mesh of rectangles, for each of which a similar block in one of the reference pictures is indicated for inter prediction. The location of the prediction block is coded as motion vector that indicates the position of the prediction block compared to the block being coded. In order to represent motion vectors efficiently those may be coded differentially with respect to block specific predicted motion vectors. In many video codecs the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted from adjacent blocks and/or from co-located blocks in a temporal reference picture. Moreover, many high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P or slices may be uni-predicted or intra-predicted. The reference pictures for a bi-predictive picture are not limited to be the subsequent picture and the previous picture in output order, but rather any reference pictures can be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to predicting from a reference picture in reference picture list 0, and prediction in backward direction may refer to predicting from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated.

In many video codecs the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU.

Many syntax element in video coding standards, such as H.264/AVC and HEVC, are entropy-coded in the encoder and entropy-decoded in the decoder. The entropy coding may be done for example using context adaptive binary arithmetic coding (CABAC), context-based variable length coding, Huffman coding, or any similar entropy coding.

Many video encoders utilize the Lagrangian cost function to find rate-distortion optimal coding modes, for example the desired macroblock mode and associated motion vectors. This type of cost function uses a weighting factor or λ to tie together the exact or estimated image distortion due to lossy coding methods and the exact or estimated amount of information required to represent the pixel/sample values in an image area. The Lagrangian cost function may be represented by the equation:

$$C = D + \lambda R$$

where C is the Lagrangian cost to be minimised, D is the image distortion (for example, the mean-squared error between the pixel/sample values in original image block and in coded image block) with the mode and motion vectors currently considered, λ is a Lagrangian coefficient and R is the number of bits needed to represent the required data to reconstruct the image block in the decoder (including the amount of data to represent the candidate motion vectors).

In some coding formats and codecs, a distinction is made between so-called short-term and long-term reference pictures. This distinction may affect some decoding processes such as motion vector scaling in the temporal direct mode or implicit weighted prediction. If both of used reference pictures for the temporal direct mode are short-term reference pictures, the motion vector used in the prediction may be scaled according to the POC difference between the current picture and each of the reference pictures. However, if at least one reference picture for the temporal direct mode is a long-term reference picture, default scaling of the motion vector is used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control requires the presence of memory management control operation (MMCO) parameters in the bitstream. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the a reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to the reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as reference and needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in HEVC, a combined list (List C), also referred to as the merge list, is constructed after the final reference picture lists (List 0 and List 1) have been constructed. The combined list may be used for uni-prediction (also known as uni-directional prediction) within B slices.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

Since multiview video provides encoders and decoders the possibility to utilize inter-view redundancy, decoded inter-view frames may be included in the reference picture list(s) as well.

The combined list in HEVC may be constructed as follows. If the modification flag for the combined list is zero, the combined list is constructed by an implicit mechanism; otherwise it is constructed by reference picture combination commands included in the bitstream. In the implicit mechanism, reference pictures in List C are mapped to reference pictures from List 0 and List 1 in an interleaved fashion starting from the first entry of List 0, followed by the first entry of List 1 and so forth. Any reference picture that has already been mapped in List C is not mapped again. In the explicit mechanism, the number of entries in List C is signaled, followed by the mapping from an entry in List 0 or List 1 to each entry of List C. In addition, when List 0 and List 1 are identical the encoder has the option of setting the ref_pic_list_combination_flag to 0 to indicate that no reference pictures from List 1 are mapped, and that List C is equivalent to List 0.

Typical high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU comprises 1) The information whether 'the PU is uni-predicted using only reference picture list0' or 'the PU is uni-predicted using only reference picture list 1' or 'the PU is bi-predicted using both reference picture list0 and list 1' 2) Motion vector value corresponding to the reference picture list0 3) Reference picture index in the reference picture list0 4) Motion vector value corresponding to the reference picture list 1 5) Reference picture index in the reference picture list 1. Similarly, predicting the motion information is carried out using the motion information of adjacent blocks and/or co-located blocks in temporal reference pictures. Typically, a list, often called as merge list, is constructed by including motion prediction candidates associated with available adjacent/co-located blocks and the index of selected motion prediction candidate in the list is signalled. Then the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism is also employed for individual PUs (not necessarily the whole CU as in skip mode) and in this case, prediction residual may be utilized to improve prediction quality. This type of prediction mode is typically named as inter-merge mode.

A syntax structure for reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

Figure 7A:
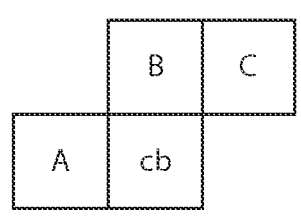
FIG. 7a shows spatial neighborhood of the currently coded block serving as the candidates for intra prediction.
Figure 7B:
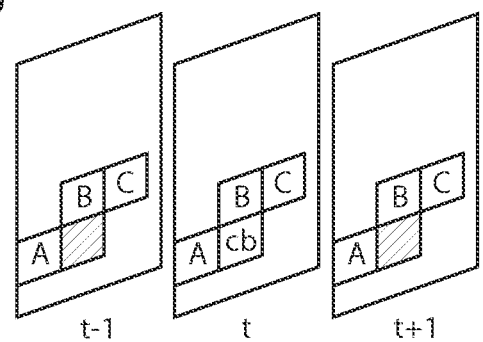
FIG. 7b shows temporal neighborhood of the currently coded block serving as the candidates for inter prediction.

Motion vector (MV) prediction specified in H.264/AVC and its MVC extension utilizes correlation which may be present in neighboring blocks of the same image (spatial correlation) or in the previously coded image (temporal correlation). FIG. 7a shows the spatial neighborhood of the currently coded block (cb) and FIG. 7b shows the temporal neighborhood of the currently coded block which serves as a candidate for a motion vector prediction in H.264/AVC.

Motion vectors of the current block cb may be estimated through the motion estimation and motion compensation process and may be coded with differential pulse code modulation (DPCM) and transmitted in the form of the residual between the motion vector prediction (MVp) and the actual motion vector MV as MVd(x, y)=MV(x, y)−MVp (x, y).

A median value of the motion vectors of the macroblock partitions or subpartitions immediately above (block B), diagonally above and to the right (block C), and immediately left (block A) of the current partition or sub-partition may be computed.

In some embodiments the motion vector prediction MVp estimation may be specified as following:

When only one of the spatial neighboring blocks (A,B,C) has identical reference index as the current block, then MVp=$mvLXN$ (1)

When more than one or no neighboring blocks (A,B, C) have identical reference index as the current block, then MVp=median{mv$LXA$,mv$LXB$, mv$LXC$}, (2)

where mvLXA, mvLXB, mvLXC are motion vectors (without reference frame id) of the spatially neighboring blocks.

In some situations a P_SKIP mode or a B_SKIP mode may be utilized. In the P_SKIP mode a reference frame index of the current block is always 0 and the list which is utilized is the first list 0 (refIdxL0=0). Motion vectors are estimated by only using the blocks immediately left (block A) and immediately above (block B) of the current block. If the block immediately left and immediately above do not exist a zero-value motion vector prediction MVp is selected. Since no MV=MVp in P_SKIP mode, no motion vector difference dMV is transmitted.

In the B_SKIP mode two motion vector prediction estimation processes may be utilized: a spatial direct mode in which motion vector prediction is computed from spatial neighboring blocks as illustrated in FIG. 7a; or a temporal direct mode in which motion vector prediction is computed from temporal neighboring blocks as illustrated in FIG. 8b.

The motion vector prediction process includes estimation of the following values:

a. reference indices refIdxL0, refIdxL1
b. motion vectors mvL0 and mvL 1.

In the spatial direct mode the process of reference index prediction and motion vector prediction is run independently for both reference picture lists (Reference Picture List 0, Reference Picture List 1). The minimal positive reference index is selected in each of lists and a motion vector prediction process is applied for each reference picture list to produce mvpL0 and mvpL1.

Each component of the motion vector prediction mvpLX is given by the median of the corresponding vector components of the motion vector mvLXA, mvLXB, and mvLXC:

mvp$LX$[0]=Median(mv$LXA$[0],mv$LXB$[0],mv$LXC$[0])

mvp$LX$[1]=Median(mv$LXA$[1],mv$LXB$[1],mv$LXC$ [1]).

In the temporal direct mode the motion vectors of the current block to the list 0 and list 1 may be calculated through temporal interpolation of motion vectors from neighboring (in temporal direction) blocks. The picture order count (POC) distance from the current frame to the referenced frame may be utilized as a factor of interpolation.

MV0=MVc*(TDb/TDd)

MV1=MVc*(TDb−TDD)/TDd, where TDb is the picture order count distance between the current frame and the reference frame in list0; TDd is the picture order count distance between referenced frames in list0 and list1; and MVc is the motion vector of the co-located block from the reference picture list0.

Next, for better understanding the embodiments of the invention, some aspects of three-dimensional (3D) multiview applications and the concepts of depth and disparity information closely related thereto are described briefly.

Stereoscopic video content consists of pairs of offset images that are shown separately to the left and right eye of the viewer. These offset images are captured with a specific stereoscopic camera setup and it assumes a particular stereo baseline distance between cameras.

FIG. 1 shows a simplified 2D model of such stereoscopic camera setup. In FIG. 1, C1 and C2 refer to cameras of the stereoscopic camera setup, more particularly to the center locations of the cameras, b is the distance between the centers of the two cameras (i.e. the stereo baseline), f is the focal length of the cameras and X is an object in the real 3D scene that is being captured. The real world object X is projected to different locations in images captured by the cameras C1 and C2, these locations being x1 and x2 respectively. The horizontal distance between x1 and x2 in absolute coordinates of the image is called disparity. The images that are captured by the camera setup are called stereoscopic images, and the disparity presented in these images creates or enhances the illusion of depth. For enabling the images to be shown separately to the left and right eye of the viewer, specific 3D glasses may be required to be used by the viewer. Adaptation of the disparity is a key feature for adjusting the stereoscopic video content to be comfortably viewable on various displays.

Figure 2:
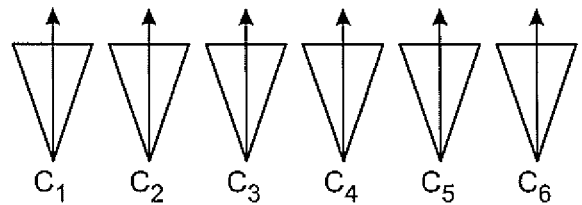
FIG. 2 shows a simplified model of a multiview camera setup.

However, disparity adaptation is not a straightforward process. It requires either having additional camera views with different baseline distance (i.e., b is variable) or rendering of virtual camera views which were not available in real world. FIG. 2 shows a simplified model of such multiview camera setup that suits to this solution. This setup is able to provide stereoscopic video content captured with several discrete values for stereoscopic baseline and thus allow stereoscopic display to select a pair of cameras that suits to the viewing conditions.

Figure 3:
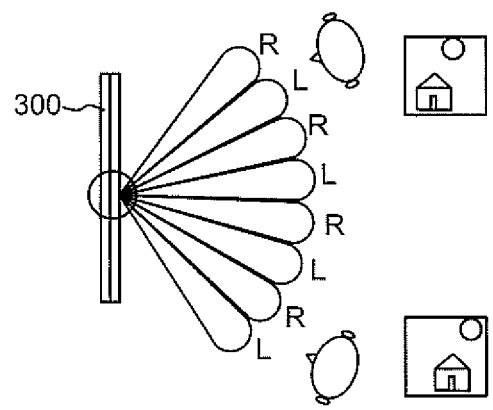
FIG. 3 shows a simplified model of a multiview autostereoscopic display (ASD)

A more advanced approach for 3D vision is having a multiview autostereoscopic display (ASD) 300 that does not require glasses. The ASD emits more than one view at a time but the emitting is localized in the space in such a way that a viewer sees only a stereo pair from a specific viewpoint, as illustrated in FIG. 3, wherein the house is seen in the middle of the view when looked at the right-most viewpoint. Moreover, the viewer is able see another stereo pair from a different viewpoint, e.g. in FIG. 3 the house is seen at the right border of the view when looked at the left-most viewpoint. Thus, motion parallax viewing is supported if consecutive views are stereo pairs and they are arranged properly. The ASD technologies may be capable of showing for example 52 or more different images at the same time, of which only a stereo pair is visible from a specific viewpoint. This supports multiuser 3D vision without glasses, for example in a living room environment.

The above-described stereoscopic and ASD applications require multiview video to be available at the display. The MVC extension of H.264/AVC video coding standard allows the multiview functionality at the decoder side. The base view of MVC bitstreams can be decoded by any H.264/AVC decoder, which facilitates introduction of stereoscopic and multiview content into existing services. MVC allows inter-view prediction, which can result into significant bitrate saving compared to independent coding of all views, depending on how correlated the adjacent views are. However, the bitrate of MVC coded video is typically proportional to the number of views. Considering that ASD may require 52 views, for example, as input, the total bitrate for such number of views will challenge the constraints of the available bandwidth.

Consequently, it has been found that a more feasible solution for such multiview application is to have a limited number of input views, e.g. a mono or a stereo view plus some supplementary data, and to render (i.e. synthesize) all required views locally at the decoder side. From several available technologies for view rendering, depth image-based rendering (DIBR) has shown to be a competitive alternative.

Figure 4:
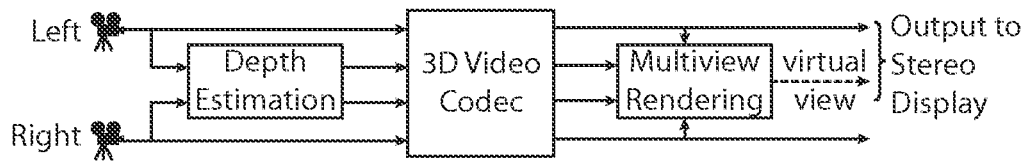
FIG. 4 shows a simplified model of a DIBR-based 3DV system.

A simplified model of a DIBR-based 3DV system is shown in FIG. 4. The input of a 3D video codec comprises a stereoscopic video and corresponding depth information with stereoscopic baseline b0. Then the 3D video codec synthesizes a number of virtual views between two input views with baseline (bi<b0). DIBR algorithms may also enable extrapolation of views that are outside the two input views and not in between them. Similarly, DIBR algorithms may enable view synthesis from a single view of texture and the respective depth view. However, in order to enable DIBR-based multiview rendering, texture data should be available at the decoder side along with the corresponding depth data.

In such 3DV system, depth information is produced at the encoder side in a form of depth pictures (also known as depth maps) for each video frame. A depth map is an image with per-pixel depth information. Each sample in a depth map represents the distance of the respective texture sample from the plane on which the camera lies. In other words, if the z axis is along the shooting axis of the cameras (and hence orthogonal to the plane on which the cameras lie), a sample in a depth map represents the value on the z axis.

Depth information can be obtained by various means. For example, depth of the 3D scene may be computed from the disparity registered by capturing cameras. A depth estimation algorithm takes a stereoscopic view as an input and computes local disparities between the two offset images of the view. Each image is processed pixel by pixel in overlapping blocks, and for each block of pixels a horizontally localized search for a matching block in the offset image is performed. Once a pixel-wise disparity is computed, the corresponding depth value z is calculated by equation (3):

$$z = \frac{f \cdot b}{d + \Delta d}, \quad (3)$$

where f is the focal length of the camera and b is the baseline distance between cameras, as shown in FIG. 1. Further, d refers to the disparity observed between the two cameras, and the camera offset Δd reflects a possible horizontal misplacement of the optical centers of the two cameras.

Figure 5:
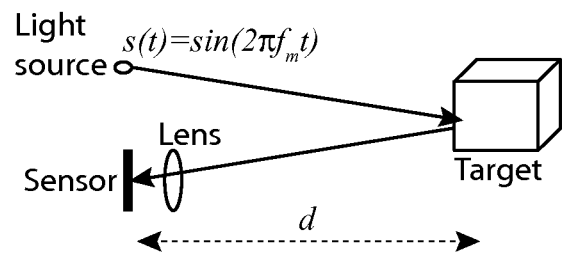
FIGS. 5 and 6 show an example of a time-of-flight-based depth estimation system.
Figure 6:
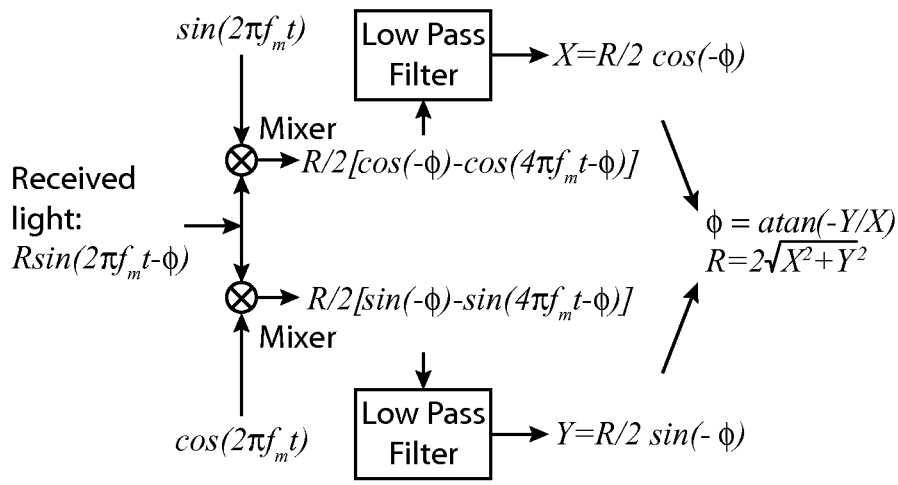

Alternatively, or in addition to the above-described stereo view depth estimation, the depth value may be obtained using the time-of-flight (TOF) principle. FIGS. 5 and 6 show an example of a TOF-based depth estimation system. The camera is provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light is typically used to make the illumination unobtrusive. The light reflected from objects in the scene is detected by an image sensor, which is modulated synchronously at the same frequency as the illuminator. The image sensor is provided with optics; a lens gathering the reflected light and an optical bandpass filter for passing only the light with the same wavelength as the illuminator, thus helping to suppress background light. The image sensor measures for each pixel the time the light has taken to travel from the illuminator to the object and back. The distance to the object is represented as a phase shift in the illumination modulation, which can be determined from the sampled data simultaneously for each pixel in the scene.

Figure 8:
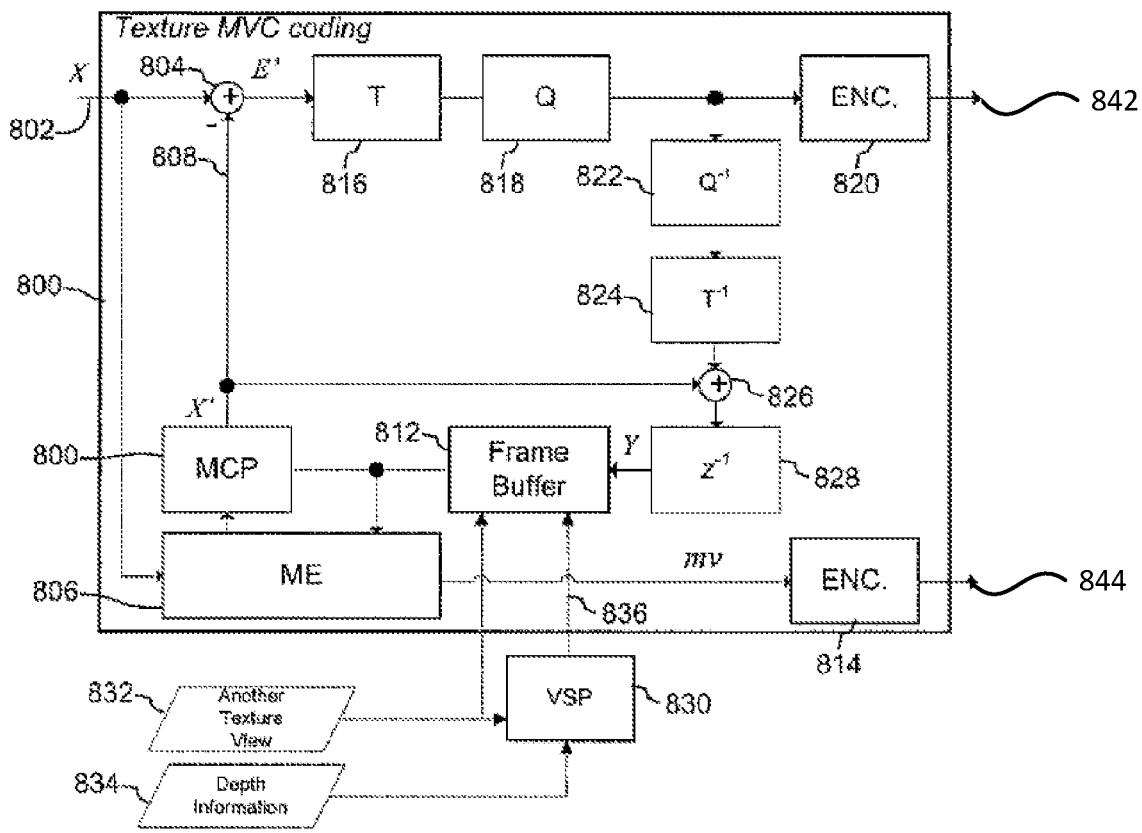
FIG. 8 shows an example of a view synthesis enabled multi-view video encoder as a simplified block diagram.

In the case of depth-enhanced multiview coding, the view synthesis can be utilized in an encoding loop of the encoder and in the decoding loop of the decoder, thus providing a view synthesis prediction (VSP). A view synthesis picture (a reference component) may be synthesized from coded texture views and depth views and may contain samples that may be used for the view synthesis prediction. A view synthesis picture may also be referred to as synthetic reference component, which may be defined to contain samples that may be used for view synthesis prediction. A synthetic reference component may be used as reference picture for view synthesis prediction but is typically not output or displayed. A view synthesis picture is typically generated for the same camera location assuming the same camera parameters as for the picture being coded or decoded. An example of the encoding loop is depicted in FIG. 8.

Inputs of an example process for deriving a view synthesis picture are a decoded luma component of the texture view component srcPicY, two chroma components srcPicCb and srcPicCr upsampled to the resolution of srcPicY, and a depth picture DisPic.

Output of an example process for deriving a view synthesis picture is a sample array of a synthetic reference component vspPic which is produced through disparity-based warping, which can be illustrated with the following pseudo code:

```
for( j = 0; j < PicHeigh ; j++ ) {
    for( i = 0; i < PicWidth; i++ ) {
        dX = Disparity(DisPic(j,i));
        outputPicY[ i+dX, j ] = srcTexturePicY[ i, j ];
        if( chroma_format_idc = = 1 ) {
            outputPicCb[ i+dX, j ] = normTexturePicCb[ i, j ]
            outputPicCr[ i+dX, j ] = normTexturePicCr[ i, j ]
        }
    }
}
``` where the function "Disparity( )" converts a depth map value at a spatial location i,j to a disparity value dX, PicHeigh is the height of the picture, PicWidth is the width of the picture, srcTexturePicY is the source texture picture, outputPicY is the Y component of the output picture, outputPicCb is the Cb component of the output picture, and outputPicCr is the Cr component of the output picture.

Disparity is computed taking into consideration camera settings, such as translation between two views b, camera's focal length f and parameters of depth map representation (Znear, Zfar) as shown below.

$$dX(i, j) = \frac{f \cdot b}{z(i, j)}; \quad (4)$$

$$z(i, j) = \frac{1}{\frac{DisPic(i, j)}{255} \cdot \left(\frac{1}{Z_{near}} - \frac{1}{Z_{far}}\right) + \frac{1}{Z_{far}}}$$

The vspPic picture resulting from the above described process may feature various warping artifacts, such as holes and/or occlusions and to suppress those artifacts, various post-processing operations, such as hole filling, may be applied.

However, these operations may be avoided to reduce computational complexity, since a view synthesis picture vspPic is utilized for a reference pictures for prediction and may not be outputted to a display.

The synthesized picture {outputPicY, outputPicCb, outputPicCr} may be introduced in the reference picture list in a similar way as is done with inter-view reference pictures. Signaling and operations with reference picture list in the case of view synthesis prediction may remain identical or similar to those specified in H.264/AVC or HEVC.

Similarly, processes of motion information derivation and their applications in view synthesis prediction may remain identical or similar to processes specified for inter and inter-view prediction of H.264/AVC or HEVC.

Introducing view synthesis prediction in 3D video encoding/decoding processes may not affect such low level operations as motion information signaling and decoding, any thus may enable preserving low-level compatibility with the existing H.264/AVC or HEVC coding standard.

Scalable video coding refers to a coding structure where one bitstream can contain multiple representations of the content at different bitrates, resolutions and/or frame rates. In these cases the receiver can extract the desired representation depending on its characteristics (e.g. resolution that matches best with the resolution of the display of the device). Alternatively, a server or a network element can extract the portions of the bitstream to be transmitted to the receiver depending on e.g. the network characteristics or processing capabilities of the receiver. A scalable bitstream may consist of a base layer providing the lowest quality video available and one or more enhancement layers that enhance the video quality when received and decoded together with the lower layers. In order to improve coding efficiency for the enhancement layers, the coded representation of that layer may depend on the lower layers. For example, the motion and mode information of the enhancement layer can be predicted from lower layers. Similarly the pixel data of the lower layers can be used to create prediction for the enhancement layer(s).

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While example embodiments are described with two scalability layers with an enhancement layer and a base layer, it needs to be understood that embodiments can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

Motion vectors used in the motion compensation may be coded differentially utilizing the motion information of surrounding prediction units. This kind of derivation process does not consider the statistical characteristics of the motion vectors in the context of certain prediction structures. For example, if a scalable video coding utilizes a base layer picture as a prediction candidate for an enhancement layer, the motion vector field may be very different from traditional motion vector fields pointing to pictures at different time instants. In another example related to 3D video coding, a source video may be produced with a parallel camera arrangements and input multiview video data is rectified to avoid misalignment of camera geometry and colors. Under these circumstances, a model of uniform probability of displacements $+/-N$ along x and y axis which suits well for bi-directional temporal prediction may not be optimal for describing displacement in the inter-view reference component. In depth-enhanced 3D video coding, a view synthesis prediction reference component is typically aligned with the picture being coded/decoded, and hence a spatially neighboring motion vector pointing to a reference picture at a different time instant is not likely to be a good prediction for the motion vector pointing to a view synthesis prediction reference component.

For example, H.264/AVC specifies that vertical motion vector components range can be up-to [−512, 511.75], whereas horizontal motion vector components can belong to another range [−2048 to 2047.75]. These specifications impose certain requirements on computation platform which performs decoding as well as memory access. Relaxing of these requirements is desirable.

In the case of inter-view prediction and rectified input videos a displacement component mv_y is likely to be close to 0, as cameras are geometrically rectified and the same object is expected to be present at the same vertical y-coordinates in all available views. The displacement in horizontal direction (x-axis) is likely to be close to a disparity value +/−n with some sub-pixel offsets. Thus, statistical assumption on motion vectors utilized in the conventional video coding systems such as H.264/AVC does not reflect actual motion vector statistics observed in inter-view prediction of H.264/MVC.

In the case of view synthesis prediction and under assumption of high quality depth maps, a displacement of motion vector components (mv_y and mv_x) are expected to be close to 0,0 with some sub-pixel offset +/−n, which may be produced by inaccuracy of the depth maps or view synthesis prediction processing. Thus, statistical assumption on motion vectors utilized in the conventional video coding systems such as H.264/AVC does not reflect actual motion vector statistics observed in view synthesis prediction of 3D video coding.

When an inter-layer reference picture is used for (de) coding an enhancement layer block, both motion vector components are expected to be 0. This is based on the assumption that the enhancement layer block may be predicted on the basis of co-located blocks on the base layer and possibly on some other lower layers. Thus, the motion vector may be regarded as pointing to the same location on a different layer. If spatial scalability is used, the base layer reference picture is assumed to be first upsampled to the resolution of the enhancement layer prior to inserting the base layer reference picture into a reference picture list of the enhancement layer.

Motion vector components resulting from the motion encoding may be differentially coded with a predicted motion vector (MVP). In some encoders this differential value is coded with CABAC and updates the CABAC contexts itself.

However, in H.264/AVC the CABAC initialization is designed on the assumption of uniform probability of displacements +/−N along x and y axis for motion vectors, which may not be optimal for inter-view prediction, view synthesis prediction, and inter-layer prediction.

A decoder may extract motion vector components from decoded bitstreams through a specified set of operations. These operations may include CABAC bits decoding, differential decoding of motion vectors, clipping resulting motion vectors to confirm that resulting motion vectors belong to a certain range (e.g. within coded frames limits). In addition to this, the decoder may perform reference frame interpolation in the case the resulting motion vectors point to a sub-pixel location in the reference frame.

In the case of view synthesis based prediction and inter-layer prediction both horizontal and vertical motion vector components (mv_x and mv_y), and in the case of inter-view prediction vertical motion vector component (mv_y) are most probably equal to zero. However, the decoder should be prepared for the worst-case complexity, i.e. sub-pixel motion vectors requiring the operations explained above. It should be noted that the decoder shall be able to perform decoding operations and required interpolation in real-time in order to comply with required levels of specified standard and a hypothetical reference decoder, even if coded bitstreams would not produce such motion vectors.

In some encoders motion vectors are predicted with respect to motion vectors of the neighboring blocks (spatial prediction) or a co-located block in another picture (temporal prediction). The actual motion vector to be used is generated by adding a differential motion vector (MVd) indicated in the bitstream to the predicted motion vector. There can be special modes (such as a "skip mode") which omit the decoding of the differential motion vector and use the predicted motion vector as the final motion vector for a prediction unit.

The encoder according to some example embodiments of the present invention may include one or more of the following operations. It should be noted here that similar principles are also applicable at a decoder side for decoding.

Figure 13:
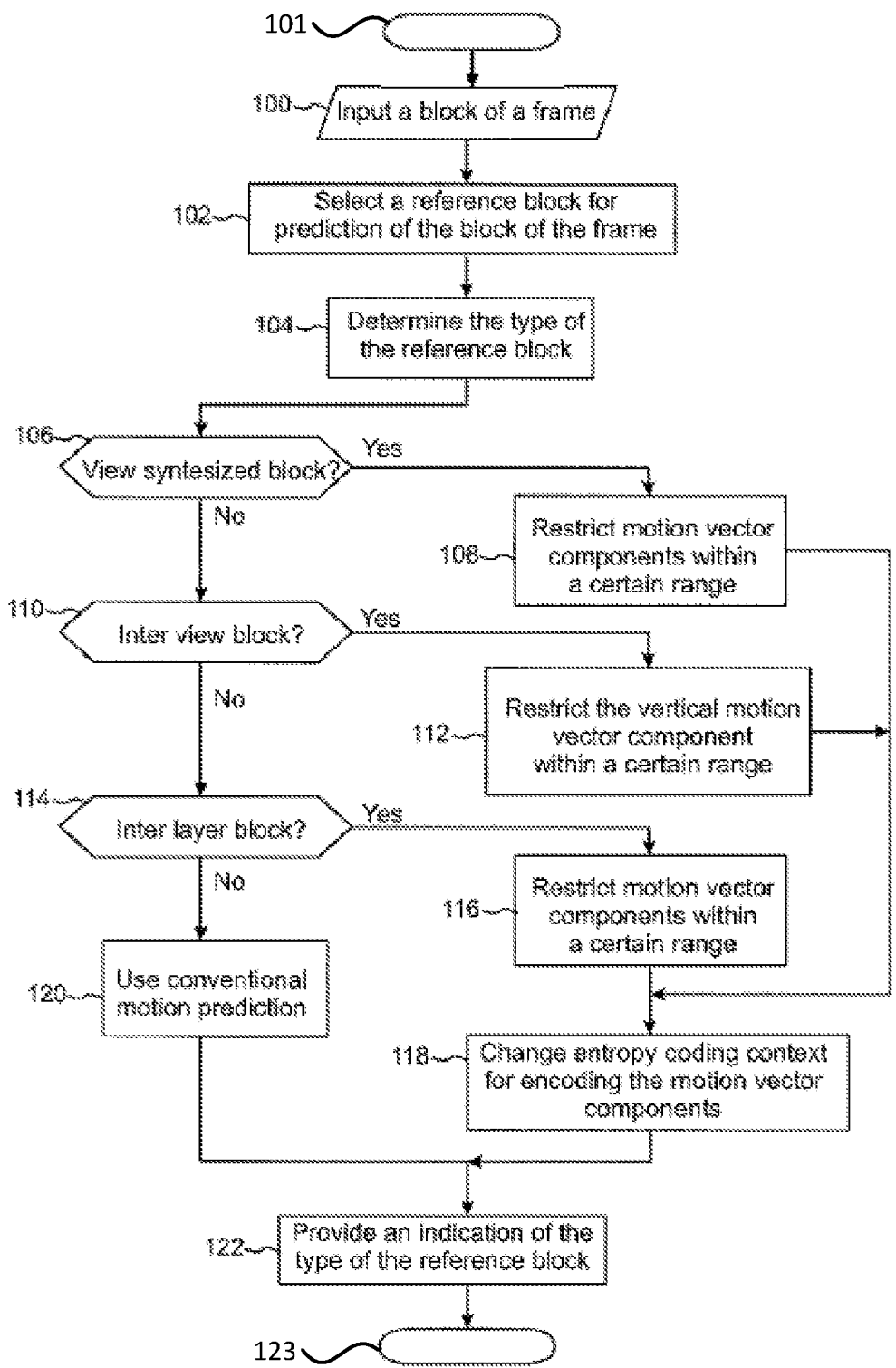
FIG. 13 shows an encoding method according to an example embodiment as a flow diagram.

An example of the encoder 800 is depicted in FIG. 8 as a simplified block diagram and the operation of the encoder according to an example embodiment is depicted as a flow diagram in FIG. 13. The encoder 800 receives 802 a block of a current frame of a texture view for encoding. The block can also be called as a current block. The current block is provided to a first combiner 804, such as a subtracting element, and to the motion estimator 806. The motion estimator 806 has access to a frame buffer 812 storing previously encoded frame(s) or the motion estimator 806 may be provided by other means one or more blocks of one or more previously encoded frames. The motion estimator 806 examines which of the one or more previously coded blocks might provide a good basis for using the block as a prediction reference for the current block. If an appropriate prediction reference has been found, the motion estimator 806 calculates a motion vector which indicates where the selected block is located in the reference frame with respect to the location of the current block in the current frame. The motion vector information may be encoded by a first entropy encoder 814. Information of the prediction reference is also provided to the motion predictor 810 which calculates the predicted block.

The first combiner 804 determines the difference between the current block and the predicted block 808. The difference may be determined e.g. by calculating difference between pixel values of the current block and corresponding pixel values of the predicted block. This difference can be called as a prediction error. The prediction error is transformed by a transform element 816 to a transform domain. The transform may be e.g. a discrete cosine transform (DCT). The transformed values are quantized by a quantizer 818. The quantized values can be encoded by the second entropy encoder 820. The quantized values can also be provided to an inverse quantizer 822 which reconstructs the transformed values. The reconstructed transformed values are then inverse transformed by an inverse transform element 824 to obtain reconstructed prediction error values. The reconstructed prediction error values are combined by a second combiner 826 with the predicted block to obtain reconstructed block values of the current block. The reconstructed block values are ordered in a correct order by an ordering element 828 and stored into the frame buffer 812.

In some embodiments the encoder 800 also comprises a view synthesis predictor 830 which may use texture view frames of one or more other views 832 and depth information 834 (e.g. the depth map) to synthesize other views 836 on the basis of e.g. two different views captured by two different cameras. The other texture view frames 832 and/or the synthesized views 836 may also be stored to the frame buffer 812 so that the motion estimator 806 may use the other views and/or synthesized views in selecting a prediction reference for the current block. In some cases (e.g. for particular types of reference pictures), the encoder may define the set of valid motion vector component values to be empty, in which case the encoding of syntax element(s) related to the motion vector component may be omitted and the value of the motion vector component may be derived in the decoding. In some cases, the encoder may define the set of valid motion vector component values to be smaller than a normal set of motion vector values for inter prediction, in which case the entropy coding for the motion vector differences may be changed e.g. by using a different CABAC context for these motion vector differences than the context for conventional inter prediction motion vectors. The different CABAC contexts may be used by the first entropy encoder 814 when encoding motion vector information. In some cases, the likelihood of motion vector values may depend more heavily on the reference picture than on the neighboring motion vectors (e.g. spatially or temporally) and hence entropy coding may differ from that used for other motion vectors, e.g. a different initial CABAC context may be used, and/or a different CABAC binarization scheme may be used, and/or a different context may be maintained and adapted or a non-context-adaptive coding of a syntax element may be used e.g. based on the type of the reference picture (e.g. view synthesis picture, inter-view reference picture, inter-layer reference picture, inter/temporal reference picture), and/or the scalability layer of the current picture and reference picture and/or the view of the current picture and the reference picture and/or any other property of the used reference picture and potentially the current picture.

In some embodiments there is provided a mechanism to indicate when the motion vector information is combined with the indication of the reference picture index. For example, the type of a reference picture may be associated with each reference picture in each reference picture list. The type of a reference picture may, for example, be a temporal (inter) reference picture, an inter-view reference, a view synthesis reference picture, or an inter-layer reference picture. The encoder and the decoder may infer the type for a reference picture and the type may be explicitly indicated by the encoder in the bitstream. The presence, the entropy coding method, and/or decoding process of the motion vector may then be inferred from the type or any other property of the reference picture being used for a prediction unit.

The encoder may encode and the decoder may decode an indication defining which reference picture or pictures have a fixed motion vector associated with them. The indication may be for example in picture or slice level. The indication may be inferred from the type of the reference picture (e.g. VSP, inter-view, and inter-layer reference picture), and/or the scalability layer of the current picture and reference picture and/or the view of the current picture and the reference picture and/or any other property of the used reference picture and potentially the current picture.

The decoder may first decode the indication about the reference index associated with the prediction unit. If that reference index points into a picture with indicated special motion vector field, the motion vector prediction and differential motion vector decoding processes may be entirely or partly bypassed and/or the context-based entropy decoding process may differ from that of conventional motion vectors. Furthermore, if differential motion vector coding has been entirely or partly bypassed, a motion vector is derived with a special process for the prediction unit.

Motion vector components utilized for view synthesis based prediction, inter-view prediction, and inter-layer prediction may be restricted in their applicability range, which define a set of syntax elements and a set of decoding operations. For example, the value range and/or the precision of motion vector components or motion vector component differences relative to prediction values may be restricted. Furthermore, in some embodiments differential motion vector components utilized for view synthesis based prediction, inter-view prediction, and/or inter-layer prediction may have different initial context compared to differential motion vector components utilized for inter or temporal motion-compensated prediction. Furthermore, in some embodiments differential motion vector components utilized for view synthesis based prediction, inter-view prediction, and/or inter-layer prediction may be binarized differently for context-based arithmetic coding and decoding compared to the binarization of differential motion vector components of inter or temporal motion-compensated prediction.

When the encoder encodes a block of a frame or a picture, the encoder may determine which reference block would provide appropriate coding efficiency. The block to be encoded has been input to the encoder which is illustrated with block 100 in FIG. 13. The reference block may belong to the same picture i.e. the prediction would be intra prediction, to a previous or a succeeding frame than the frame of the current block thus representing inter prediction, to a synthesized view thus representing a view synthesis prediction, to a frame of a different view thus representing inter-view prediction, or to a frame of a different layer thus representing inter-layer prediction. Without restricting the scope of the present invention, intra prediction and inter prediction may also be called as conventional intra prediction and conventional inter prediction, respectively, in this application.

When the encoder has selected 102 the reference block for the current block (i.e. the prediction reference) and determined 104 the type of the reference block, the encoder may insert 122 an indication of the reference block (frame) into a bitstream. The indication may be or may comprise a reference index and the indication may be interpreted to represent a type of prediction.

The operation of the encoder may then depend on the type of prediction. If the type of prediction is the conventional inter prediction, the encoder may then determine the motion vector(s) on the basis of the prediction reference and determine the difference between the actual motion vector and the motion vector of the prediction reference. This difference may also be called as a differential motion vector (MVd). The encoder may then encode 120 the motion vector difference into the bitstream.

If the type of the prediction is the view synthesis prediction 106 or the inter-layer prediction 114, the encoder may restrict 108, 116 the horizontal and vertical components of motion vectors mv_x, mv_y within a range [−a,a]. The range may be pre-determined, e.g. the value of a may be required to be 0, or it may be signaled for example per-sequence basis e.g. in a sequence parameter set syntax structure. In a general case, the range may also be asymmetric [a,b] where a<b and a needs not be equal to b. Moreover, in a general case, the range for the horizontal motion vector component may differ from that for the respective vertical motion vector component. In that case, the limits for the horizontal components of motion vectors mv_x, mv_y may be expressed as a first range [a1,b1], and the limits for the vertical components of motion vectors mv_x, mv_y may be expressed as a second range [a2,b2].

If the type of the prediction is the inter-view prediction 110, the encoder may restrict 112 the vertical components mv_y of motion vectors within a range [−a,a]. The range may be pre-determined, e.g. the value of a may be required to be 0, or it may be signaled for example per-sequence basis e.g. in a sequence parameter set syntax structure. In a general case, the range may also be asymmetric [a,b] where a<b and a needs not be equal to b.

In some embodiments applicable range restrictions (a, b) for motion vectors may be estimated over a large test set. One possible example is a zero restriction, i.e. a is equal to 0, for both horizontal and vertical motion vector components of the inter-layer prediction and the view synthesis prediction and for the vertical motion vector component of the inter-view prediction.

In some embodiments applicable range restrictions (a, b) for motion vectors the integer part of a motion vector is restricted to 0 and a sub-pixel part of the motion vector may be unrestricted within the limits of the accuracy of the representation of the sub-pixel part. Thus, the actual motion vector range may be [−0.75, 0.75] in H.264/AVC and HEVC based coding systems. If the accuracy were 0.25, the motion vector range would contain the following values in this example: [−0.75, −0.5, −0.25, 0, 0.25, 0.5, 0.75].

In some embodiments the precision of motion vectors and motion vector differences for certain types of prediction or reference pictures (e.g., view synthesis pictures, inter-view reference pictures, and/or inter-layer reference pictures) may be different from that for inter or temporal reference pictures. For example, the precision of a quarter-pixel (0.25) may be used for inter or temporal reference pictures, but an integer-pixel precision may be used for view synthesis reference pictures.

Context initialization tables may be defined 118 for view synthesis, inter-layer and inter-view predicted motion vectors to be used by an entropy encoder in an apparatus transmitting video streams and/or by an entropy decoder in an apparatus receiving video streams. The context and/or initialization value of a CABAC context for motion vectors may be derived e.g. using a large set of test sequences for which statistics of motion vectors may be computed for example through encoding.

Figure 9:
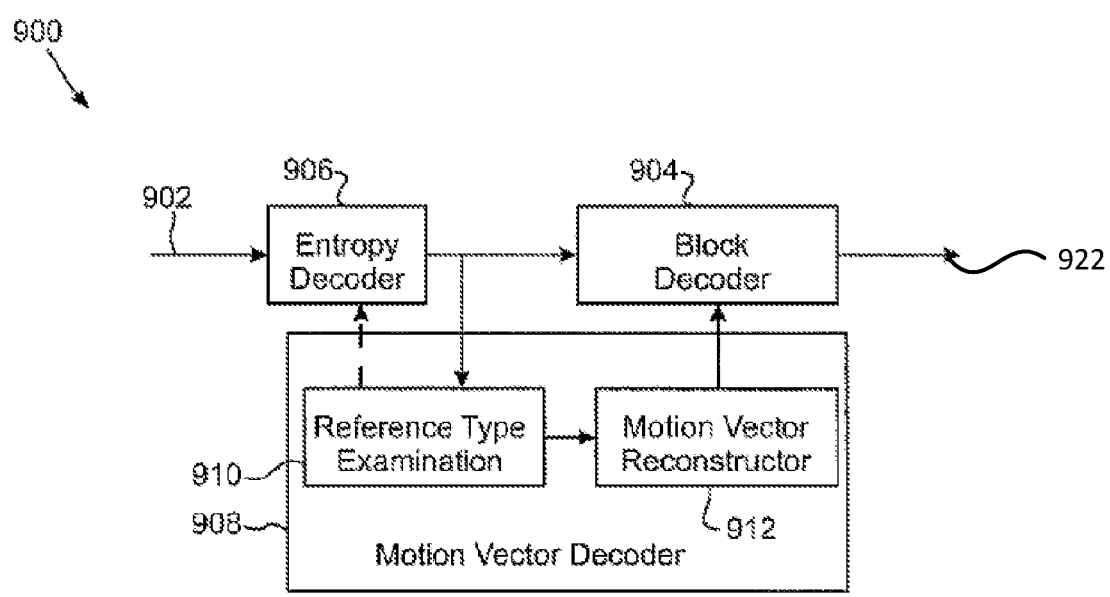
FIG. 9 shows an example of a view synthesis enabled multi-view video decoder as a simplified block diagram.
Figure 14:
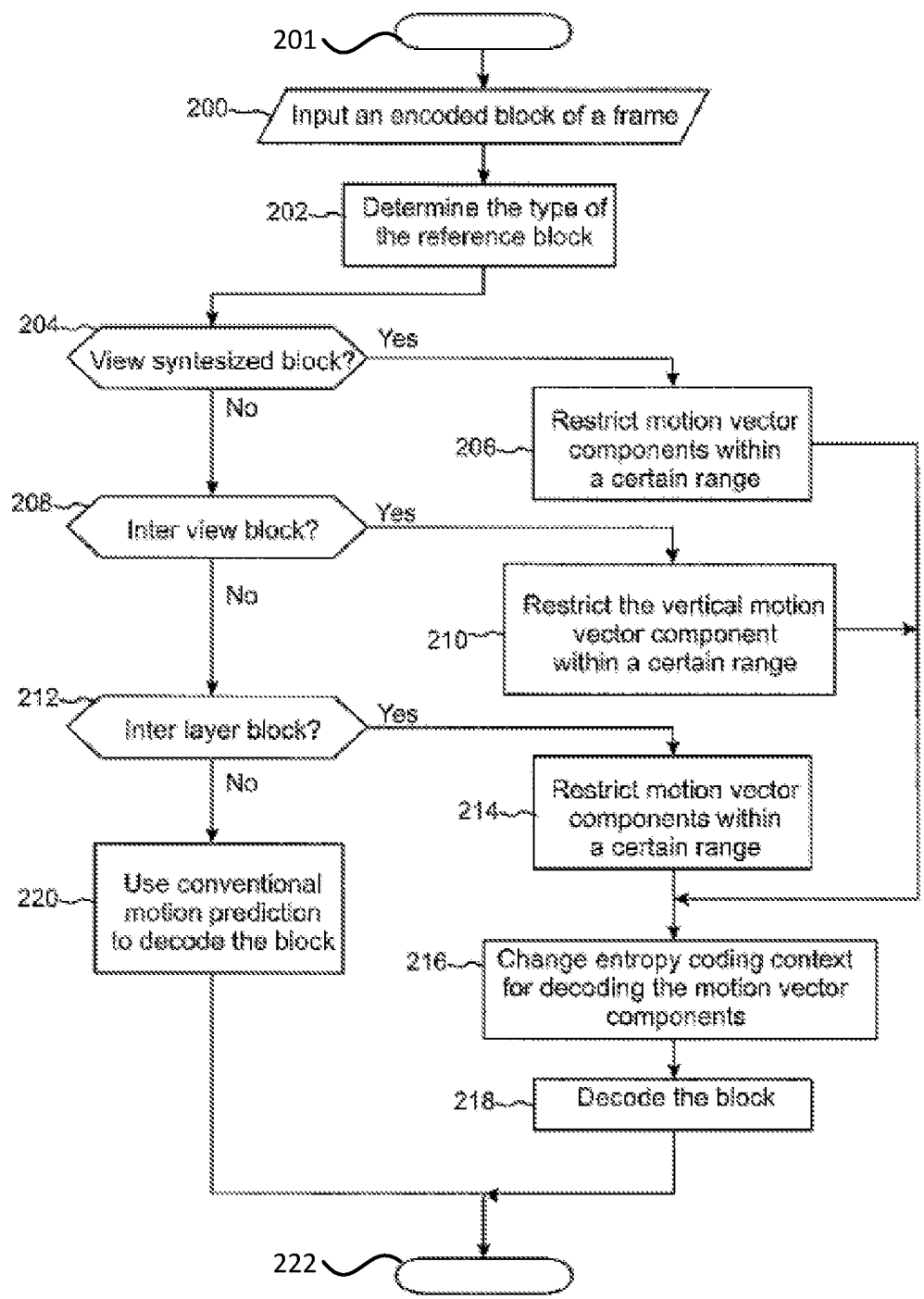
FIG. 14 shows a decoding method according to an example embodiment as a flow diagram.

In the following, the operation of an example embodiment of a decoder 900 will be described with reference to FIG. 9 and the flow diagram of FIG. 14. The decoder 900 receives 200, 902 a bitstream or a part of a bitstream which contains encoded video information. The encoded video information may contain prediction error values, motion vectors, reference indices, etc. It should be noted here that all this information need not be included in the same bitstream but some of the information may be transmitted in different bitstreams using different kinds of syntax elements.

In the following the decoding relating to the motion vector processing is mainly described and describing other decoding operations 904 such as reconstruction of blocks is mostly omitted from this specification.

The decoder 900 may comprise an entropy decoder 906 which decodes received, entropy encoded information. The decoded information may be provided to a motion vector decoder 908. The motion vector decoder 908 may comprise a reference type examining element 910 which may examine the decoded information to determine whether a reference index or another kind of reference indication of the type of the reference for the current block has been included in the received bitstream. If the reference indication has been received, the reference type examining element 910 may determine 202 the reference type on the basis of the reference indication. If the reference indication has not been received, the reference type examining element 910 may use other data to determine the reference type.

The motion vector decoder 908 may further comprise a motion vector reconstructing element 912 which may reconstruct the motion vector components for the current block.

If the reference indication indicates that the current block has been predicted using a conventional intra prediction, the current block may be reconstructed 220 by using received prediction error information and information of previously decoded blocks within the same frame than the current frame. If the indication indicates that the current block has been predicted using a conventional inter prediction, motion vector information and prediction error information are decoded and used together with the prediction reference i.e. the block of other, previously decoded frame which the encoder 800 has used when constructing 220 the prediction reference for the current frame.

If the reference indication indicates that the current block has been predicted using view synthesis prediction 204, the following operations may be performed by the decoder 900 in some embodiments. The decoder 900 may include or may have received from the encoder 800 information of the range [−a, b] within which horizontal and vertical motion vector components are restricted 206. In other words, the decoder is aware that the horizontal and vertical motion vector components should not have values outside the range [−a, b]. In some embodiments a equals b but as a general case a need not be equal to b. In some embodiments a=b=0. The decoder also reads syntax elements describing the horizontal and vertical motion vector components mv_x and mv_y, respectively, and decodes 216 the horizontal and vertical motion vector components to be used in obtaining 218 the current block. However, if the value of a (and b) equals 0 and the encoder has not coded differential motion vector components into the bitstream, the decoder 900 does not read the syntax elements describing the horizontal and vertical motion vector components. Moreover, the decoder can omit decoding motion vector components. Instead, the decoder can determine that the values of the horizontal and vertical motion vector components are both zero, i.e. mv_x=mv_y=0. There is also no need to interpolate the reference picture when a=b=0.

If the reference indication indicates that the current block has been predicted using inter-view prediction 208, the following operations may be performed by the decoder 900 in some embodiments. The decoder 900 may include or may have received from the encoder 800 information of the range [−a, b] within which vertical motion vector components are restricted 210. In other words, the decoder is aware that the vertical motion vector components should not have values outside the range [−a, b]. In some embodiments a equals b but as a general case a need not be equal to b. In some embodiments a=b=0. The decoder also reads syntax elements describing the horizontal and vertical motion vector components mv_x and mv_y, respectively, and decodes 216 the horizontal and vertical motion vector components to be used in obtaining 218 the current block. However, if the value of a (and b) equals 0 and the encoder has not coded differential vertical motion vector component into the bitstream, the decoder 900 does not read the syntax elements describing the vertical motion vector components but only reads the syntax elements describing the horizontal motion vector components and decodes the horizontal motion vector components to be used in obtaining the current block. There is also no need to interpolate the reference picture in the vertical direction when a=b=0.

If the reference indication indicates that the current block has been predicted using inter-layer prediction 212, the following operations may be performed by the decoder 900 in some embodiments. The decoder 900 may include or may have received from the encoder 800 information of the range [−a, b] within which horizontal and vertical motion vector components are restricted 214. In other words, the decoder is aware that the horizontal and vertical motion vector components should not have values outside the range [−a, b]. In some embodiments a equals b but as a general case a need not be equal to b. In some embodiments a=b=0. The decoder also reads syntax elements describing the horizontal and vertical motion vector components mv_x and mv_y, respectively, and decodes 216 the horizontal and vertical motion vector components to be used in obtaining 218 the current block. However, if the value of a (and b) equals 0 and the encoder has not coded differential motion vector components into the bitstream, the decoder 900 does not read the syntax elements describing the horizontal and vertical motion vector components. Moreover, the decoder can omit decoding motion vector components. Instead, the decoder can determine that the values of the horizontal and vertical motion vector components are both zero, i.e. mv_x=mv_y=0. There is also no need to interpolate the reference picture when a=b=0.

In cases where motion vector component is not coded into the bitstream, the decoder also skips reading of syntax element(s) related to the motion vector component. Motion vector components for which no syntax elements are present in the bitstream are inferred e.g. using pre-defined default values.

In cases where a different CABAC context is used for certain reference picture types, the decoder first concludes the reference picture type for example based on the reference index, then chooses the CABAC context according to the reference picture type in use for the prediction unit, and finally reads and decodes the differential motion vector component(s) from the bitstream using the chosen CABAC context.

The encoder may encode and the decoder may decode syntax elements determining a fixed motion vector to be used instead of a motion vector prediction and differentially coded motion vector for conventional inter prediction. The fixed motion vector syntax elements may for example be in picture or slice level and be coded in and decoded from e.g. a picture parameter set, an adaptation parameter set, a picture header, or a slice header. The fixed motion vector syntax elements may concern for example a picture, a slice, a tile, a number of prediction units, determined for example based on the syntax structure including the fixed motion vector syntax elements or explicit syntax elements such as the number of prediction units for which the fixed motion vector syntax elements are in force. The encoder may determine the fixed motion vector for example based on the global disparity for multiview coding, which may be for example a disparity for those pixels intended to be perceived on the screen level instead of in front of or behind the screen level.

The encoder may encode and the decoder may decode prediction unit level indication of the reference picture index associated with the prediction unit. The indication may be a syntax element indicating the reference index or it may be a syntax element, such as a coding mode, from which the reference index may be derived.

The decoder may include a comparison identifying whether the selected reference picture index indicates usage of one of the reference pictures with a fixed motion vector associated with it. In the case there is a fixed motion vector associated with the reference picture, the decoder may select that motion vector to perform the motion compensated prediction for the prediction unit. In the case there is no fixed motion vector associated with the reference picture, the decoder may generate the motion vector information utilizing e.g. motion vectors of the neighboring prediction units and differential motion vector information.

The encoder and decoder may perform motion compensated prediction for the prediction unit utilizing the selected motion vector.

In example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

In example embodiments, the following descriptors may be used to specify the parsing process of each syntax element.

ae(v): context-adaptive arithmetic (CABAC) entropy-coded syntax element b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with most significant bit written first.

ue(v): unsigned integer Exp-Golomb-coded syntax element with the left bit first.

An Exp-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

A code number corresponding to an Exp-Golomb bit string may be converted to se(v) for example using the following table:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| ... | ... |

In example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

In example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

In an example embodiment, the prediction unit syntax of a draft HEVC standard is modified such a way that the presence of motion vector differences for the inter mode depends on the type and/or the scalability layer and/or the view and/or any other property of the used reference picture. Typically, the used reference picture is identified by a reference picture index in the bitstream. For reference pictures in the base view and in the base layer, motion vector differences are typically defined to be present for the inter mode. However, it can be specified in a scalable extension for example that no motion vector difference is present for a particular reference picture type without any change in the prediction unit syntax. An example of the prediction unit syntax structure is as follows with the added parts indicated with underlining:

| prediction_unit( x0, y0, log2CbSize ) { | Descriptor |
|---|---|
| . . . | |
| } else { /* MODE_INTER */ | |
|   merge_flag[ x0 ][ y0 ] | ae(v) |
|   if( merge_flag[ x0 ][ y0 ] ) { | |
|     if( MaxNumMergeCand > 1 ) | |
|       merge_idx[ x0 ][ y0 ] | ae(v) |
|   } else { | |
|     if( slice_type = = B ) | |
|       inter_pred_flag[ x0 ][ y0 ] | ae(v) |
|     if( inter_pred_flag[ x0 ][ y0 ] = = Pred_LC ) { | |
|       if( num_ref_idx_lc_active_minus1 > 0 ) | |
|         ref_idx_lc[ x0 ][ y0 ] | ae(v) |
|       <u>if( ( PredLCToPredLx[ ref_idx_lc[ x0 ][ y0 ] ] = = Pred_L0</u> | |
|         <u>&& MvdPresent( RefIdxLCToRefIdxLx, RefPicList0 ) ) ||</u> | |
|         <u>( PredLCToPredLx[ ref_idx_lc[ x0 ][ y0 ] ] = = Pred_L1</u> | |
|         <u>&& MvdPresent( RefIdxLCToRefIdxLx, RefPicList1 ) ) )</u> | |
|         mvd_coding(mvd_lc[ x0 ][ y0 ][ 0 ], | |
|           mvd_lc[ x0 ][ y0 ][ 1 ]) | |
|       mvp_lc_flag[ x0 ][ y0 ] | ae(v) |
|     } else { /* Pred_L0 or Pred_BI */ | |
|       if( num_ref_idx_l0_active_minus1 > 0 ) | |
|         ref_idx_l0[ x0 ][ y0 ] | ae(v) |
|       <u>if( MvdPresent( ref_idx_l0[ x0 ][ y0 ], RefPictList0 ) )</u> | |
|         mvd_coding(mvd_l0[ x0 ][ y0 ][ 0 ], | |
|           mvd_l0[ x0 ][ y0 ][ 1 ]) | |
|       mvp_l0_flag[ x0 ][ y0 ] | ae(v) |
|     } | |
|     if( inter_pred_flag[ x0 ][ y0 ] = = Pred_BI ) { | |
|       if( num_ref_idx_l1_active_minus1 > 0 ) | |
|         ref_idx_l1[ x0 ][ y0 ] | ae(v) |
|       if( mvd_l1_zero_flag ) { | |
|         mvd_l1[ x0 ][ y0 ][ 0 ] = 0 | |
|         mvd_l1[ x0 ][ y0 ][ 1 ] = 0 | |
|       } else <u>if( MvdPresent( ref_idx_l1[ x0 ][ y0 ], RefPictList1 ) )</u> | |
|         mvd_coding( mvd_l1[ x0 ][ y0 ][ 0 ], | |
|           mvd_l1[ x0 ][ y0 ][ 1 ] ) | |
|       mvp_l1_flag[ x0 ][ y0 ] | ae(v) |
|     } | |
|   } | |
| } | |

As can be seen from the syntax structure above, the return value of the MvdPresent(refIdx, LX) function is used to determine whether or not the mvd_coding( ) syntax structure is present for the reference picture with index refIdx from the reference picture list LX. The function MvdPresent (refIdx, LX) may be specified as follows. When the current picture (being decoded) is in the base layer and base view (e.g., when LayerId is equal to 0) and index refIdx in the reference picture list LX identifies a picture in the base layer and base view (e.g., when LayerId is equal to 0), the function MvdPresent returns 1. When index refIdx in the reference picture list LX identifies a view synthesis picture, the function MvdPresent returns 0. When the current picture (being decoded) is in an enhancement layer and base view (e.g., when LayerId is equal to CurrLayerId, which is greater than 0) and index refIdx in the reference picture list LX identifies a picture in a lower layer such as the base layer (e.g., when LayerId is of the referred picture is less than CurrLayerId), the function MvdPresent returns 0.

While embodiments of the invention have been described using particular coding standards and their extensions as basis, the invention can be applied for other codecs, bitstream formats, and coding structures too.

There is provided the following elements which can be combined into a single solution, as will be described below, or they can be utilized separately. As explained earlier, both a video encoder and a video decoder typically apply a prediction mechanism, hence the following elements may apply similarly to both a video encoder and a video decoder.

In various embodiments presented above neighboring blocks to the current block being coded/decoded cb are selected. Examples of selecting neighboring blocks include spatial neighbors (e.g. as indicated in FIG. 7a). Other examples include temporal in previous and/or later frames of the same view (e.g. as indicated in FIG. 7b), spatial neighbors in adjacent views, spatial neighbors in different layers, and spatial neighbors in synthesized views. The aspects of the invention are not limited to the mentioned methods of selecting neighboring blocks, but rather the description is given for one possible basis on top of which other embodiments of the invention may be partly or fully realized.

While many of the embodiments are described for prediction for luma, it is to be understood that in many coding arrangements chroma prediction information may be derived from luma prediction information using pre-determined relations. For example, it may be assumed that the same reference samples are used for the chroma components as for luma.

Figure 10:
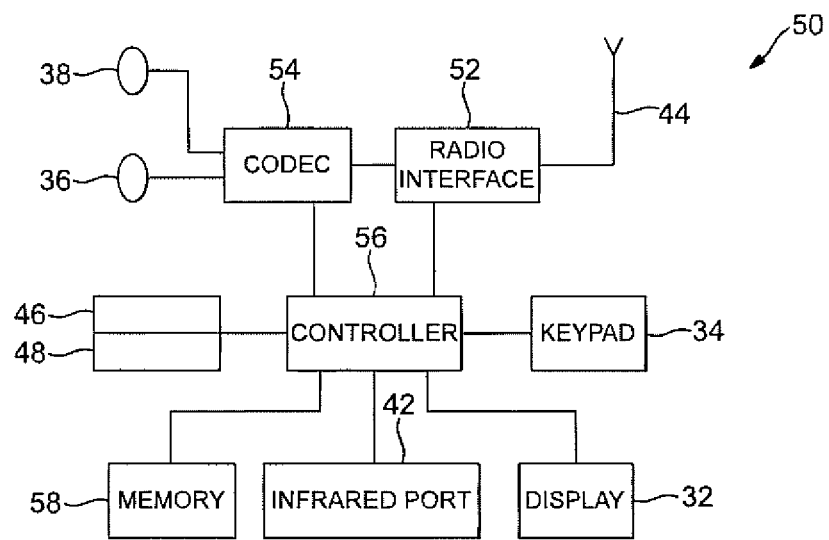
FIG. 10 shows schematically an electronic device suitable for employing some embodiments of the invention.
Figure 11:
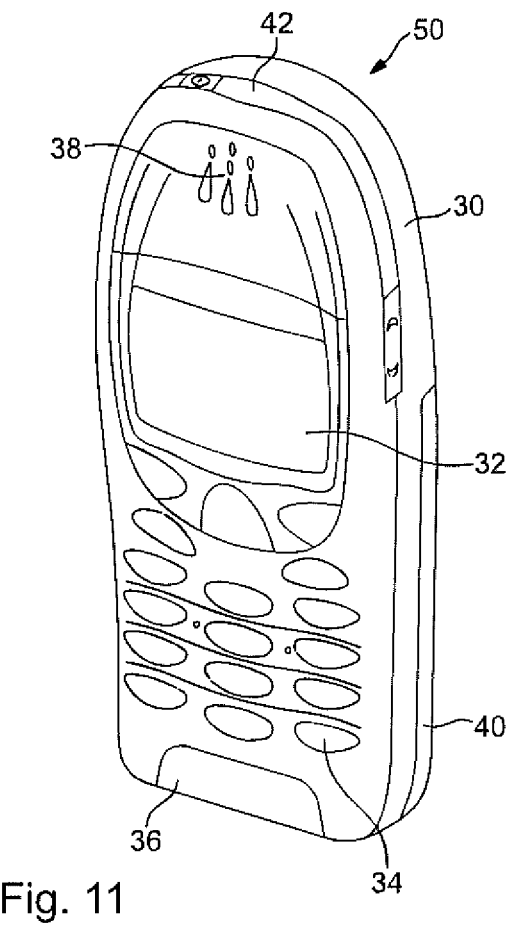
FIG. 11 shows schematically a user equipment suitable for employing some embodiments of the invention.

The following describes in further detail suitable apparatus and possible mechanisms for implementing the embodiments of the invention. In this regard reference is first made to FIG. 10 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 12:
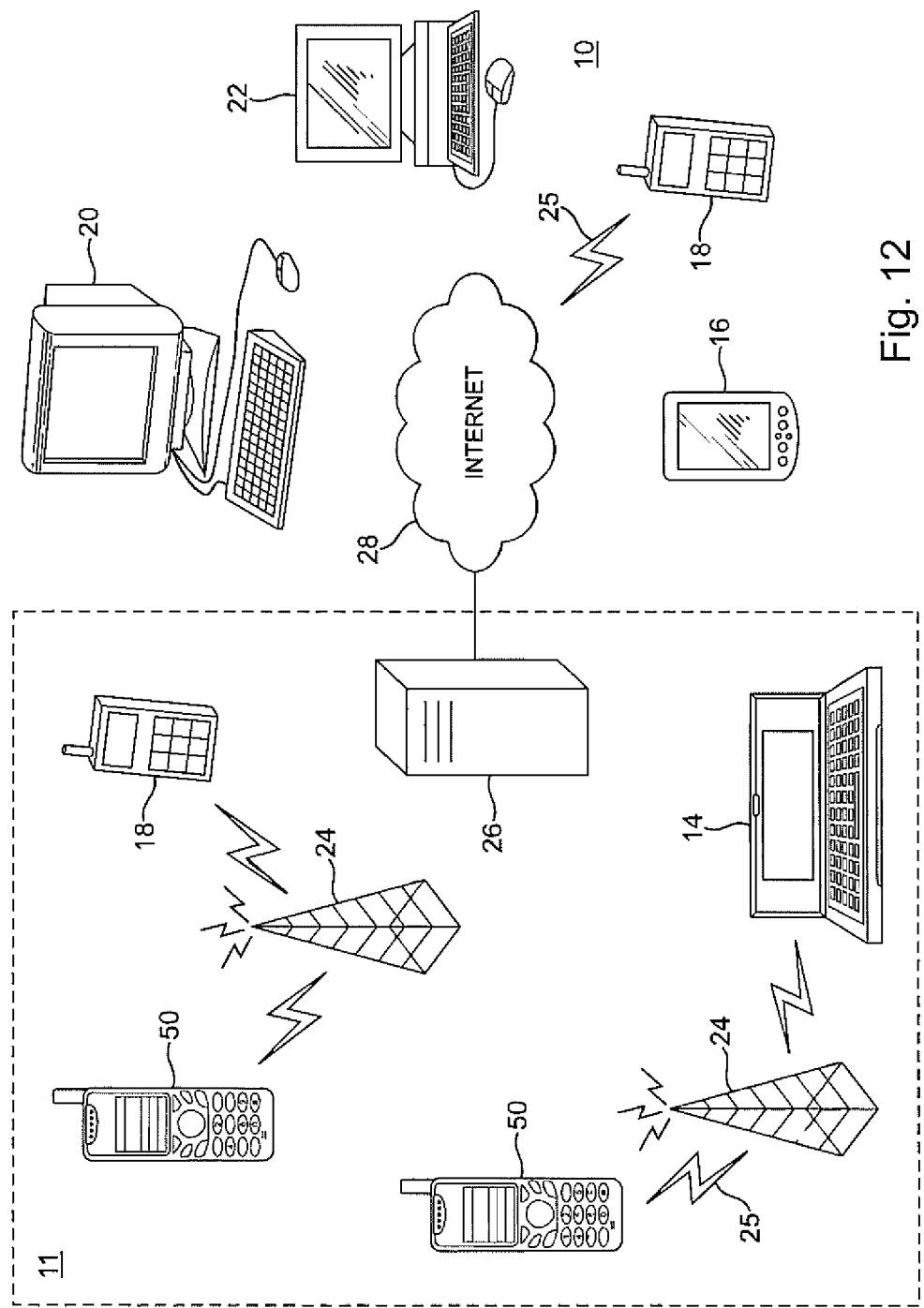
FIG. 12 further shows schematically electronic devices employing embodiments of the invention connected using wireless and wired network connections.

With respect to FIG. 12, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 12 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following, some examples will be provided.

According to a first example, there is provided a method comprising:
  selecting a current block of a frame for encoding;
  selecting a reference block for the current block;
  determining a reference type on the basis of the selected reference block;
  determining a motion vector for the current block on the basis of the reference type and the reference block; and
  encoding motion vector information on the basis of the determined motion vector.

According to a second example there is provided a method comprising:
  selecting a current block of a frame for encoding;
  selecting a reference block for the current block;
  determining a reference picture index identifying the picture the reference block belongs to;
  determining a motion vector for the current block on the basis of the reference picture index; and
  encoding motion vector information on the basis of the determined motion vector.

In some embodiments the method comprises providing one or more reference frames for the selecting of the reference block.

In some embodiments the method comprises the one or more reference frames comprises at least one of the following:
  a view synthesized frame;
  an inter-view frame;
  an inter-layer frame; or
  an inter-predicted frame.

In some embodiments the method comprises the determining a motion vector comprising determining a horizontal motion vector component and a vertical motion vector component for the motion vector.

In some embodiments the method comprises:

restricting the vertical motion vector component within a first range [a1,b1], if the selected reference block is from the view synthesized frame, the inter-view frame or the inter-layer frame; and restricting the horizontal motion vector component within a second range [a2,b2], if the selected reference block is from the view synthesized frame or the inter-layer frame.

In some embodiments a1 equals b1, and a2 equals b2.

In some embodiments a1 equals 0, and a2 equals 0.

In some embodiments the method comprises providing an indication of the reference type.

In some embodiments the method comprises providing at least a first reference picture list indicative of pictures used as reference pictures from which the reference block may be selected.

In some embodiments the method comprises providing the reference type in the first reference picture list associated with the reference picture from which the reference block has been selected.

In some embodiments the method comprises defining a fixed motion vector for reference blocks selected from the view synthesized frame, the inter-view frame or the inter-layer frame.

In some embodiments the method comprises providing a motion vector syntax element for the fixed motion vector; and providing the motion vector syntax element in a picture level; or in a slice level.

In some embodiments the method comprises encoding the motion vector syntax element in a picture parameter set, in an adaptation parameter set, in a picture header, or in a slice header.

In some embodiments the method comprises determining the fixed motion vector based on a global disparity for multiview coding.

In some embodiments the method comprises using a disparity for those pixels intended to be perceived on a screen level as the global disparity.

In some embodiments the method comprises:

determining a first entropy coding context and a second entropy coding context;

using the second entropy coding context in encoding motion vectors, when the reference block is selected from the view synthesized frame, the inter-view frame or the inter-layer frame; and using the first entropy coding context in encoding motion vectors, when the reference block is not selected from the view synthesized frame, the inter-view frame or the inter-layer frame.

In some embodiments the method is used in a mobile communication device to encode video information.

In some embodiments the video information is multiview video information.

According to a third example there is provided an apparatus comprising at least one processor and at least one memory including computer program code, the at least one memory and the computer program code configured to, with the at least one processor, cause the apparatus to:

select a current block of a frame for encoding;

select a reference block for the current block;

determine a reference type on the basis of the selected reference block;

determine a motion vector for the current block on the basis of the reference type and the reference block; and encode motion vector information on the basis of the determined motion vector.

According to a fourth example there is provided an apparatus comprising at least one processor and at least one memory including computer program code, the at least one memory and the computer program code configured to, with the at least one processor, cause the apparatus to:

select a current block of a frame for encoding;

select a reference block for the current block;

determine a reference picture index identifying the picture the reference block belongs to;

determine a motion vector for the current block on the basis of the reference picture index; and encode motion vector information on the basis of the determined motion vector.

In some embodiments of the apparatus said at least one memory stored with code thereon, which when executed by said at least one processor, further causes the apparatus to provide one or more reference frames for the selection of the reference block.

In some embodiments of the apparatus the one or more reference frames comprises at least one of the following:

a view synthesized frame;

an inter-view frame;

an inter-layer frame; or an inter-predicted frame.

In some embodiments of the apparatus said at least one memory stored with code thereon, which when executed by said at least one processor, further causes the apparatus to determine a horizontal motion vector component and a vertical motion vector component for the motion vector.

In some embodiments of the apparatus said at least one memory stored with code thereon, which when executed by said at least one processor, further causes the apparatus to:

restrict the vertical motion vector component within a first range [a1,b1], if the selected reference block is from the view synthesized frame, the inter-view frame or the inter-layer frame; and restrict the horizontal motion vector component within a second range [a2,b2], if the selected reference block is from the view synthesized frame or the inter-layer frame.

In some embodiments of the apparatus a1 equals b1, and a2 equals b2.

In some embodiments of the apparatus a1 equals 0, and a2 equals 0.

In some embodiments of the apparatus said at least one memory stored with code thereon, which when executed by said at least one processor, further causes the apparatus to provide an indication of the reference type.

In some embodiments of the apparatus said at least one memory stored with code thereon, which when executed by said at least one processor, further causes the apparatus to provide at least a first reference picture list indicative of pictures used as reference pictures from which the reference block may be selected.

In some embodiments of the apparatus said at least one memory stored with code thereon, which when executed by said at least one processor, further causes the apparatus to provide the reference type in the first reference picture list associated with the reference picture from which the reference block has been selected.

In some embodiments of the apparatus said at least one memory stored with code thereon, which when executed by said at least one processor, further causes the apparatus to define a fixed motion vector for reference blocks selected from the view synthesized frame, the inter-view frame or the inter-layer frame.

In some embodiments of the apparatus said at least one memory stored with code thereon, which when executed by said at least one processor, further causes the apparatus to provide a motion vector syntax element for the fixed motion vector; and to provide the motion vector syntax element in a picture level; or in a slice level.

In some embodiments of the apparatus said at least one memory stored with code thereon, which when executed by said at least one processor, further causes the apparatus to encode the motion vector syntax element in a picture parameter set, in an adaptation parameter set, in a picture header, or in a slice header.

In some embodiments of the apparatus said at least one memory stored with code thereon, which when executed by said at least one processor, further causes the apparatus to determine the fixed motion vector based on a global disparity for multiview coding.

In some embodiments of the apparatus said at least one memory stored with code thereon, which when executed by said at least one processor, further causes the apparatus to use a disparity for those pixels intended to be perceived on a screen level as the global disparity.

In some embodiments of the apparatus said at least one memory stored with code thereon, which when executed by said at least one processor, further causes the apparatus to
 determine a first entropy coding context and a second entropy coding context;
 use the second entropy coding context in encoding motion vectors, when the reference block is selected from the view synthesized frame, the inter-view frame or the inter-layer frame; and
 use the first entropy coding context in encoding motion vectors, when the reference block is not selected from the view synthesized frame, the inter-view frame or the inter-layer frame.

In some embodiments of the apparatus said at least one memory stored with code thereon, which when executed by said at least one processor, further causes the apparatus to encode video information.

In some embodiments of the apparatus the video information is multiview video information.

In some embodiments the apparatus is a component of a mobile station.

According to a fifth example there is provided a computer program product including one or more sequences of one or more instructions which, when executed by one or more processors, cause an apparatus to at least perform the following:
 select a current block of a frame for encoding;
 select a reference block for the current block;
 determine a reference type on the basis of the selected reference block;
 determine a motion vector for the current block on the basis of the reference type and the reference block; and
 encode motion vector information on the basis of the determined motion vector.

According to a sixth example there is provided a computer program product including one or more sequences of one or more instructions which, when executed by one or more processors, cause an apparatus to at least perform the following:
 select a current block of a frame for encoding;
 select a reference block for the current block;
 determine a reference picture index identifying the picture the reference block belongs to;
 determine a motion vector for the current block on the basis of the reference picture index; and
 encode motion vector information on the basis of the determined motion vector.

In some embodiments the computer program product includes one or more sequences of one or more instructions which, when executed by one or more processors, cause the apparatus to at least provide one or more reference frames for the selection of the reference block.

In some embodiments of the computer program product the one or more reference frames comprises at least one of the following:
 a view synthesized frame;
 an inter-view frame;
 an inter-layer frame; or
 an inter-predicted frame.

In some embodiments the computer program product includes one or more sequences of one or more instructions which, when executed by one or more processors, cause the apparatus to at least determine a horizontal motion vector component and a vertical motion vector component for the motion vector.

In some embodiments the computer program product includes one or more sequences of one or more instructions which, when executed by one or more processors, cause the apparatus to at least perform the following:
 restrict the vertical motion vector component within a first range [a1,b1], if the selected reference block is from the view synthesized frame, the inter-view frame or the inter-layer frame; and
 restrict the horizontal motion vector component within a second range [a2,b2], if the selected reference block is from the view synthesized frame or the inter-layer frame.

In some embodiments of the computer program product a1 equals b1, and a2 equals b2.

In some embodiments of the computer program product a1 equals 0, and a2 equals 0.

In some embodiments the computer program product includes one or more sequences of one or more instructions which, when executed by one or more processors, cause the apparatus to at least provide an indication of the reference type.

In some embodiments the computer program product includes one or more sequences of one or more instructions which, when executed by one or more processors, cause the apparatus to at least provide at least a first reference picture list indicative of pictures used as reference pictures from which the reference block may be selected.

In some embodiments the computer program product includes one or more sequences of one or more instructions which, when executed by one or more processors, cause the apparatus to at least provide the reference type in the first reference picture list associated with the reference picture from which the reference block has been selected.

In some embodiments the computer program product includes one or more sequences of one or more instructions which, when executed by one or more processors, cause the apparatus to at least define a fixed motion vector for reference blocks selected from the view synthesized frame, the inter-view frame or the inter-layer frame.

In some embodiments the computer program product includes one or more sequences of one or more instructions which, when executed by one or more processors, cause the apparatus to at least provide a motion vector syntax element for the fixed motion vector; and providing the motion vector syntax element in a picture level; or in a slice level.

In some embodiments the computer program product includes one or more sequences of one or more instructions which, when executed by one or more processors, cause the apparatus to at least encode the motion vector syntax element in a picture parameter set, in an adaptation parameter set, in a picture header, or in a slice header.

In some embodiments the computer program product includes one or more sequences of one or more instructions which, when executed by one or more processors, cause the apparatus to at least determine the fixed motion vector based on a global disparity for multiview coding.

In some embodiments the computer program product includes one or more sequences of one or more instructions which, when executed by one or more processors, cause the apparatus to at least use a disparity for those pixels intended to be perceived on a screen level as the global disparity.

In some embodiments the computer program product includes one or more sequences of one or more instructions which, when executed by one or more processors, cause the apparatus to at least perform the following:

determine a first entropy coding context and a second entropy coding context;

use the second entropy coding context in encoding motion vectors, when the reference block is selected from the view synthesized frame, the inter-view frame or the inter-layer frame; and use the first entropy coding context in encoding motion vectors, when the reference block is not selected from the view synthesized frame, the inter-view frame or the inter-layer frame.

In some embodiments the computer program product includes one or more sequences of one or more instructions which, when executed by one or more processors, cause the apparatus to at least encode video information.

In some embodiments of the computer program product the video information is multiview video information.

According to a seventh example there is provided an apparatus comprising:

means for selecting a current block of a frame for encoding;

means for selecting a reference block for the current block;

means for determining a reference type on the basis of the selected reference block;

means for determining a motion vector for the current block on the basis of the reference type and the reference block; and means for encoding motion vector information on the basis of the determined motion vector.

According to an eighth example there is provided an apparatus comprising:

means for selecting a current block of a frame for encoding;

means for selecting a reference block for the current block;

means for determining a reference picture index identifying the picture the reference block belongs to;

means for determining a motion vector for the current block on the basis of the reference picture index; and means for encoding motion vector information on the basis of the determined motion vector.

In some embodiments the apparatus comprises means for providing one or more reference frames for the selecting of the reference block.

In some embodiments of the apparatus the one or more reference frames comprises at least one of the following:

a view synthesized frame;
an inter-view frame;
an inter-layer frame; or
an inter-predicted frame.

In some embodiments the apparatus comprises means for determining a horizontal motion vector component and a vertical motion vector component for the motion vector.

In some embodiments the apparatus comprises:

means for restricting the vertical motion vector component within a first range [a1,b1], if the selected reference block is from the view synthesized frame, the inter-view frame or the inter-layer frame; and means for restricting the horizontal motion vector component within a second range [a2,b2], if the selected reference block is from the view synthesized frame or the inter-layer frame.

In some embodiments of the apparatus a1 equals b1, and a2 equals b2.

In some embodiments of the apparatus a1 equals 0, and a2 equals 0.

In some embodiments the apparatus comprises means for providing an indication of the reference type.

In some embodiments the apparatus comprises means for providing at least a first reference picture list indicative of pictures used as reference pictures from which the reference block may be selected.

In some embodiments the apparatus comprises means for providing the reference type in the first reference picture list associated with the reference picture from which the reference block has been selected.

In some embodiments the apparatus comprises means for defining a fixed motion vector for reference blocks selected from the view synthesized frame, the inter-view frame or the inter-layer frame.

In some embodiments the apparatus comprises means for providing a motion vector syntax element for the fixed motion vector; and providing the motion vector syntax element in a picture level; or in a slice level.

In some embodiments the apparatus comprises means for encoding the motion vector syntax element in a picture parameter set, in an adaptation parameter set, in a picture header, or in a slice header.

In some embodiments the apparatus comprises means for determining the fixed motion vector based on a global disparity for multiview coding.

In some embodiments the apparatus comprises means for using a disparity for those pixels intended to be perceived on a screen level as the global disparity.

In some embodiments the apparatus comprises:

means for determining a first entropy coding context and a second entropy coding context;

means for using the second entropy coding context in encoding motion vectors, when the reference block is selected from the view synthesized frame, the inter-view frame or the inter-layer frame; and means for using the first entropy coding context in encoding motion vectors, when the reference block is not selected from the view synthesized frame, the inter-view frame or the inter-layer frame.

In some embodiments the apparatus is a component of a mobile communication device comprising means for encoding video information.

In some embodiments of the apparatus the video information is multiview video information.

According to a ninth example there is provided a method comprising:

receiving a bit stream comprising encoded information relating to a current block of a frame;

decoding the encoded information;

examining the received information to determine whether the decoded information contains indication of a reference type for the current block;

if so, using the reference type to determine how to obtain motion vector information relating to the current block; and obtaining the motion vector information.

According to a tenth example there is provided a method comprising:

receiving a bit stream comprising encoded information relating to a current block of a frame;

decoding the encoded information;

examining the received information to determine whether the decoded information contains indication of a reference picture index identifying the picture the reference block belongs to;

if so, using the reference picture index to determine how to obtain motion vector information relating to the current block; and obtaining the motion vector information.

In some embodiments the method comprises providing one or more reference frames for the selecting of the reference block.

In some embodiments of the method the one or more reference frames comprises at least one of the following:

a view synthesized frame;
an inter-view frame;
an inter-layer frame; or
an inter-predicted frame.

In some embodiments of the method the determining a motion vector comprises determining a horizontal motion vector component and a vertical motion vector component for the motion vector.

In some embodiments the method comprises:

restricting the vertical motion vector component within a first range [a1,b1], if the selected reference block is from the view synthesized frame, the inter-view frame or the inter-layer frame; and restricting the horizontal motion vector component within a second range [a2,b2], if the selected reference block is from the view synthesized frame or the inter-layer frame.

In some embodiments of the method a1 equals b1, and a2 equals b2.

In some embodiments of the method a1 equals 0, and a2 equals 0.

In some embodiments the method comprises receiving an indication of the reference type.

In some embodiments the method comprises providing at least a first reference picture list indicative of pictures used as reference pictures from which the reference block has been selected.

In some embodiments the method comprises providing the reference type in the first reference picture list associated with the reference picture from which the reference block has been selected.

In some embodiments the method comprises defining a fixed motion vector for reference blocks selected from the view synthesized frame, the inter-view frame or the inter-layer frame.

In some embodiments the method comprises providing a motion vector syntax element for the fixed motion vector; and receiving the motion vector syntax element in a picture level; or in a slice level.

In some embodiments the method comprises decoding the motion vector syntax element from a picture parameter set, from an adaptation parameter set, from a picture header, or from a slice header.

In some embodiments the method comprises determining the fixed motion vector based on a global disparity for multiview coding.

In some embodiments the method comprises using a disparity for those pixels intended to be perceived on a screen level as the global disparity.

In some embodiments the method comprises:

determining a first entropy coding context and a second entropy coding context;

using the second entropy coding context in decoding motion vectors, when the reference block is selected from the view synthesized frame, the inter-view frame or the inter-layer frame; and using the first entropy coding context in decoding motion vectors, when the reference block is not selected from the view synthesized frame, the inter-view frame or the inter-layer frame.

In some embodiments the method is used in a mobile communication device to decode video information.

In some embodiments of the method the video information is multiview video information.

According to an eleventh example there is provided an apparatus comprising at least one processor and at least one memory including computer program code, the at least one memory and the computer program code configured to, with the at least one processor, cause the apparatus to:

receive a bit stream comprising encoded information relating to a current block of a frame;

decode the encoded information;

examine the received information to determine whether the decoded information contains indication of a reference type for the current block;

if so, use the reference type to determine how to obtain motion vector information relating to the current block; and obtain the motion vector information.

According to a twelfth example there is provided an apparatus comprising at least one processor and at least one memory including computer program code, the at least one memory and the computer program code configured to, with the at least one processor, cause the apparatus to:

receive a bit stream comprising encoded information relating to a current block of a frame;

decode the encoded information;

examine the received information to determine whether the decoded information contains indication of a reference picture index identifying the picture the reference block belongs to;

if so, use the reference picture index to determine how to obtain motion vector information relating to the current block; and obtain the motion vector information.

In some embodiments of the apparatus said at least one memory stored with code thereon, which when executed by said at least one processor, further causes the apparatus to provide one or more reference frames for the selection of the reference block.

In some embodiments of the apparatus the one or more reference frames comprises at least one of the following:

a view synthesized frame;
an inter-view frame;
an inter-layer frame; or
an inter-predicted frame.

In some embodiments of the apparatus said at least one memory stored with code thereon, which when executed by said at least one processor, further causes the apparatus to determine a horizontal motion vector component and a vertical motion vector component for the motion vector.

In some embodiments of the apparatus said at least one memory stored with code thereon, which when executed by said at least one processor, further causes the apparatus to:
restrict the vertical motion vector component within a first range [a1,b1], if the selected reference block is from the view synthesized frame, the inter-view frame or the inter-layer frame; and
restrict the horizontal motion vector component within a second range [a2,b2], if the selected reference block is from the view synthesized frame or the inter-layer frame.

In some embodiments of the apparatus a1 equals b1, and a2 equals b2.

In some embodiments of the apparatus a1 equals 0, and a2 equals 0.

In some embodiments of the apparatus said at least one memory stored with code thereon, which when executed by said at least one processor, further causes the apparatus to receive an indication of the reference type.

In some embodiments of the apparatus said at least one memory stored with code thereon, which when executed by said at least one processor, further causes the apparatus to provide at least a first reference picture list indicative of pictures used as reference pictures from which the reference block has been selected.

In some embodiments of the apparatus said at least one memory stored with code thereon, which when executed by said at least one processor, further causes the apparatus to provide the reference type in the first reference picture list associated with the reference picture from which the reference block has been selected.

In some embodiments of the apparatus said at least one memory stored with code thereon, which when executed by said at least one processor, further causes the apparatus to define a fixed motion vector for reference blocks selected from the view synthesized frame, the inter-view frame or the inter-layer frame.

In some embodiments of the apparatus said at least one memory stored with code thereon, which when executed by said at least one processor, further causes the apparatus to provide a motion vector syntax element for the fixed motion vector; and to receive the motion vector syntax element in a picture level; or in a slice level.

In some embodiments of the apparatus said at least one memory stored with code thereon, which when executed by said at least one processor, further causes the apparatus to decode the motion vector syntax element in a picture parameter set, in an adaptation parameter set, in a picture header, or in a slice header.

In some embodiments of the apparatus said at least one memory stored with code thereon, which when executed by said at least one processor, further causes the apparatus to determine the fixed motion vector based on a global disparity for multiview coding.

In some embodiments of the apparatus said at least one memory stored with code thereon, which when executed by said at least one processor, further causes the apparatus to use a disparity for those pixels intended to be perceived on a screen level as the global disparity.

In some embodiments of the apparatus said at least one memory stored with code thereon, which when executed by said at least one processor, further causes the apparatus to determine a first entropy coding context and a second entropy coding context;
use the second entropy coding context in decoding motion vectors, when the reference block is selected from the view synthesized frame, the inter-view frame or the inter-layer frame; and
use the first entropy coding context in decoding motion vectors, when the reference block is not selected from the view synthesized frame, the inter-view frame or the inter-layer frame.

In some embodiments of the apparatus said at least one memory stored with code thereon, which when executed by said at least one processor, further causes the apparatus to decode video information.

In some embodiments of the apparatus the video information is multiview video information.

In some embodiments the apparatus is a component of a mobile station.

According to a thirteenth example there is provided a computer program product including one or more sequences of one or more instructions which, when executed by one or more processors, cause an apparatus to at least perform the following:
receive a bit stream comprising encoded information relating to a current block of a frame;
decode the encoded information;
examine the received information to determine whether the decoded information contains indication of a reference type for the current block;
if so, use the reference type to determine how to obtain motion vector information relating to the current block; and
obtain the motion vector information.

According to a fourteenth example there is provided a computer program product including one or more sequences of one or more instructions which, when executed by one or more processors, cause an apparatus to at least perform the following:
receive a bit stream comprising encoded information relating to a current block of a frame;
decode the encoded information;
examine the received information to determine whether the decoded information contains indication of a reference picture index identifying the picture the reference block belongs to;
if so, use the reference picture index to determine how to obtain motion vector information relating to the current block; and
obtain the motion vector information.

In some embodiments the computer program product includes one or more sequences of one or more instructions which, when executed by one or more processors, cause the apparatus to at least provide one or more reference frames for the selection of the reference block.

In some embodiments of the computer program product the one or more reference frames comprises at least one of the following:
a view synthesized frame;
an inter-view frame;
an inter-layer frame; or
an inter-predicted frame.

In some embodiments the computer program product includes one or more sequences of one or more instructions which, when executed by one or more processors, cause the apparatus to at least determine a horizontal motion vector component and a vertical motion vector component for the motion vector.

In some embodiments the computer program product includes one or more sequences of one or more instructions which, when executed by one or more processors, cause the apparatus to at least perform the following:

restrict the vertical motion vector component within a first range [a1,b1], if the selected reference block is from the view synthesized frame, the inter-view frame or the inter-layer frame; and restrict the horizontal motion vector component within a second range [a2,b2], if the selected reference block is from the view synthesized frame or the inter-layer frame.

In some embodiments of the computer program product a1 equals b1, and a2 equals b2.

In some embodiments of the computer program product a1 equals 0, and a2 equals 0.

In some embodiments the computer program product includes one or more sequences of one or more instructions which, when executed by one or more processors, cause the apparatus to at least receive an indication of the reference type.

In some embodiments the computer program product includes one or more sequences of one or more instructions which, when executed by one or more processors, cause the apparatus to at least provide at least a first reference picture list indicative of pictures used as reference pictures from which the reference block may be selected.

In some embodiments the computer program product includes one or more sequences of one or more instructions which, when executed by one or more processors, cause the apparatus to at least provide the reference type in the first reference picture list associated with the reference picture from which the reference block has been selected.

In some embodiments the computer program product includes one or more sequences of one or more instructions which, when executed by one or more processors, cause the apparatus to at least define a fixed motion vector for reference blocks selected from the view synthesized frame, the inter-view frame or the inter-layer frame.

In some embodiments the computer program product includes one or more sequences of one or more instructions which, when executed by one or more processors, cause the apparatus to at least provide a motion vector syntax element for the fixed motion vector; and to receive the motion vector syntax element in a picture level; or in a slice level.

In some embodiments the computer program product includes one or more sequences of one or more instructions which, when executed by one or more processors, cause the apparatus to at least decode the motion vector syntax element in a picture parameter set, in an adaptation parameter set, in a picture header, or in a slice header.

In some embodiments the computer program product includes one or more sequences of one or more instructions which, when executed by one or more processors, cause the apparatus to at least determine the fixed motion vector based on a global disparity for multiview coding.

In some embodiments the computer program product includes one or more sequences of one or more instructions which, when executed by one or more processors, cause the apparatus to at least use a disparity for those pixels intended to be perceived on a screen level as the global disparity.

In some embodiments the computer program product includes one or more sequences of one or more instructions which, when executed by one or more processors, cause the apparatus to at least perform the following:

determine a first entropy coding context and a second entropy coding context;

use the second entropy coding context in decoding motion vectors, when the reference block is selected from the view synthesized frame, the inter-view frame or the inter-layer frame; and use the first entropy coding context in decoding motion vectors, when the reference block is not selected from the view synthesized frame, the inter-view frame or the inter-layer frame.

In some embodiments the computer program product includes one or more sequences of one or more instructions which, when executed by one or more processors, cause the apparatus to at least decode video information.

In some embodiments of the computer program product the video information is multiview video information.

According to a fifteenth example there is provided an apparatus comprising:

means for receiving a bit stream comprising encoded information relating to a current block of a frame;

means for decoding the encoded information;

means for examining the received information to determine whether the decoded information contains indication of a reference type for the current block;

means for using the reference type to determine how to obtain motion vector information relating to the current block, if the encoded information contains indication of a reference type for the current block; and means for obtaining the motion vector information.

According to a sixteenth example there is provided an apparatus comprising:

means for receiving a bit stream comprising encoded information relating to a current block of a frame;

means for decoding the encoded information;

means for examining the received information to determine whether the decoded information contains indication of a reference picture index identifying the picture the reference block belongs to;

means for using the reference picture index to determine how to obtain motion vector information relating to the current block, if the encoded information contains indication of a reference type for the current block; and means for obtaining the motion vector information.

In some embodiments the apparatus comprises means for providing one or more reference frames for the selecting of the reference block.

In some embodiments of the apparatus the one or more reference frames comprises at least one of the following:

a view synthesized frame;

an inter-view frame;

an inter-layer frame; or an inter-predicted frame.

In some embodiments the apparatus comprises means for determining a horizontal motion vector component and a vertical motion vector component for the motion vector.

In some embodiments the apparatus comprises:

means for restricting the vertical motion vector component within a first range [a1,b1], if the selected reference block is from the view synthesized frame, the inter-view frame or the inter-layer frame; and means for restricting the horizontal motion vector component within a second range [a2,b2], if the selected reference block is from the view synthesized frame or the inter-layer frame.

In some embodiments of the apparatus a1 equals b1, and a2 equals b2.

In some embodiments of the apparatus a1 equals 0, and a2 equals 0.

In some embodiments the apparatus comprises means for receiving an indication of the reference type.

In some embodiments the apparatus comprises means for providing at least a first reference picture list indicative of pictures used as reference pictures from which the reference block may be selected.

In some embodiments the apparatus comprises means for providing the reference type in the first reference picture list associated with the reference picture from which the reference block has been selected.

In some embodiments the apparatus comprises means for defining a fixed motion vector for reference blocks selected from the view synthesized frame, the inter-view frame or the inter-layer frame.

In some embodiments the apparatus comprises means for providing a motion vector syntax element for the fixed motion vector; and receiving the motion vector syntax element in a picture level; or in a slice level.

In some embodiments the apparatus comprises means for decoding the motion vector syntax element in a picture parameter set, in an adaptation parameter set, in a picture header, or in a slice header.

In some embodiments the apparatus comprises means for determining the fixed motion vector based on a global disparity for multiview coding.

In some embodiments the apparatus comprises means for using a disparity for those pixels intended to be perceived on a screen level as the global disparity.

In some embodiments the apparatus comprises:

means for determining a first entropy coding context and a second entropy coding context;

means for using the second entropy coding context in decoding motion vectors, when the reference block is selected from the view synthesized frame, the inter-view frame or the inter-layer frame; and means for using the first entropy coding context in decoding motion vectors, when the reference block is not selected from the view synthesized frame, the inter-view frame or the inter-layer frame.

In some embodiments the apparatus is a component of a mobile communication device comprising means for decoding video information.

In some embodiments of the apparatus the video information is multiview video information.

According to a seventeenth example there is provided a video coder configured for:
 selecting a current block of a frame for encoding;
 selecting a reference block for the current block;
 determining a reference type on the basis of the selected reference block;
 determining a motion vector for the current block on the basis of the reference type and the reference block; and
 encoding motion vector information on the basis of the determined motion vector.

According to an eighteenth example there is provided a video coder configured for:
 selecting a current block of a frame for encoding;
 selecting a reference block for the current block;
 determining a reference picture index identifying the picture the reference block belongs to;
 determining a motion vector for the current block on the basis of the reference picture index; and
 encoding motion vector information on the basis of the determined motion vector.

According to a nineteenth example there is provided a video decoder configured for:

receiving a bit stream comprising encoded information relating to a current block of a frame;
 decoding the encoded information;
 examining the received information to determine whether the decoded information contains indication of a reference type for the current block;
 if so, using the reference type to determine how to obtain motion vector information relating to the current block; and
 obtaining the motion vector information.

According to a twentieth example there is provided a video decoder configured for:
 receiving a bit stream comprising encoded information relating to a current block of a frame;
 decoding the encoded information;
 examining the received information to determine whether the decoded information contains indication of a reference picture index identifying the picture the reference block belongs to;
 if so, using the reference picture index to determine how to obtain motion vector information relating to the current block; and
 obtaining the motion vector information.

We claim:

1. A method comprising:
 selecting a current block of a picture for encoding an enhancement layer of the picture;
 constructing a reference picture list for the current block, the reference picture list comprising at least a decoded base-layer of the picture for inter-layer prediction, and a decoded enhancement layer picture for inter prediction;
 selecting a reference block for the current block, the reference block selected from a reference picture in the reference picture list;
 determining a reference picture index identifying the selected reference picture to which the reference block belongs;
 determining a reference type indicating a type of prediction between the current block and the reference block based on the reference picture index, including determining whether the type of prediction is an inter-layer prediction or an inter-view prediction;
 determining a motion vector for the current block on the basis of the reference type, wherein a precision of the motion vectors differs based on the reference type,
 wherein in response to the reference type indicating that the type of prediction between the current block and the reference block is an inter-layer prediction, determining the motion vector comprises setting the motion vector for the current block to zero, and the current block is predicted based on the reference block;
 wherein in response to the reference type indicating that the type of prediction between the current block and the reference block is an inter-view prediction, determining the motion vector comprises setting a vertical motion vector component of the motion vector for the current block to zero; and
 encoding motion vector information on the basis of the determined motion vector.

2. The method according to claim 1 further comprising providing one or more reference pictures for the selecting of the reference block, wherein the reference picture list further comprises at least one of the following:
 a view synthesized picture;
 an inter-view picture;
 or
 an inter-predicted picture.

3. The method according to claim 2, wherein the determining a motion vector comprises determining a horizontal motion vector component and a vertical motion vector component for the motion vector, further comprising:
  restricting the vertical motion vector component within a first range [a1,b1], if the selected reference block is from the view synthesized picture, or the inter-view picture; and
  restricting the horizontal motion vector component within a second range [a2,b2], if the selected reference block is from the view synthesized picture.

4. The method according to claim 2 further comprising defining a fixed motion vector for reference blocks selected from the view synthesized picture, or the inter-view picture; and providing a motion vector syntax element for the fixed motion vector.

5. The method according to claim 4 further comprising determining the fixed motion vector based on a global disparity for multiview coding.

6. The method according to claim 1 further comprising:
  determining a first entropy coding context and a second entropy coding context;
  using the second entropy coding context in encoding motion vectors, when the reference block is selected from the view synthesized picture, the inter-view picture or the inter-layer picture; and
  using the first entropy coding context in encoding motion vectors, when the reference block is not selected from the view synthesized picture, the inter-view picture or the inter-layer picture.

7. An apparatus comprising at least one processor and at least one memory including computer program code, the at least one memory and the computer program code configured to, with the at least one processor, cause the apparatus to:
  select a current block of a picture for encoding an enhancement layer of the picture;
  construct a reference picture list for the current block, the reference picture list comprising at least a decoded base-layer of the picture for inter-layer prediction, and a decoded enhancement layer picture for inter-prediction;
  select a reference block for the current block, the reference block selected from a reference picture in the reference picture list;
  determine a reference picture index identifying the selected reference picture to which the reference block belongs
  determine a reference type indicating a type of prediction between the current block and the reference block based on the reference picture index, including determining whether the type of prediction is an inter-layer prediction or an inter-view prediction;
  determine a motion vector for the current block on the basis of the reference type,
  wherein a precision of the motion vectors differs based on the reference type, wherein in response to the reference type indicating that the type of prediction between the current block and the reference block is an inter-layer prediction, determining the motion vector comprises setting the motion vector for the current block to zero, and the current block is predicted based on the reference block;
  wherein in response to the reference type indicating that the type of prediction between the current block and the reference block is an inter-view prediction, determining the motion vector comprises setting a vertical motion vector component of the motion vector for the current block to zero; and
  encode motion vector information on the basis of the determined motion vector.

8. The apparatus according to claim 7, wherein said at least one memory stored with code thereon, which when executed by said at least one processor, further causes the apparatus to determine a horizontal motion vector component and a vertical motion vector component for the motion vector, and to restrict the vertical motion vector component within a first range [a1,b1], if the selected reference block is from a view synthesized picture, or an inter-view picture; and
  restrict the horizontal motion vector component within a second range [a2,b2], if the selected reference block is from the view synthesized picture.

9. A method comprising:
  receiving a bit stream comprising encoded information relating to a current block of a picture representing an enhancement layer of the picture;
  constructing a reference picture list for the current block, the reference picture list comprising at least a decoded base-layer of the picture for inter-layer prediction, and a decoded enhancement layer picture for inter-prediction;
  decoding, from the encoded information, a reference picture index identifying a reference picture from the reference picture list;
  determining a reference type for the current block based on the reference picture index, wherein the reference type for the current block defines a type of prediction between the current block and a reference block by defining whether the type of prediction is an inter-layer prediction or an inter-view prediction;
  using the reference type to determine how to obtain motion vector information relating to the current block,
  wherein in response to the reference type indicating that the type of prediction between the current block and the reference block is an inter-layer prediction, using the reference type to determine that the motion vector for the current block is set to zero, and the current block is predicted based on the reference block;
  wherein in response to the reference type indicating that the type of prediction between the current block and the reference block is an inter-view prediction, using the reference type to determine that a vertical motion vector component of the motion vector for the current block is set to zero, and wherein a precision of the motion vectors differs based on the reference type;
  obtaining the motion vector information; and
  performing a prediction for the current block based on the reference block.

10. The method according to claim 9, wherein the reference type is at least one of the following:
  view synthesis prediction;
  inter-view prediction; or
  inter-layer prediction.

11. The method according to claim 9, wherein the reference picture list comprises at least one of the following types:
  a view synthesized picture;
  an inter-view picture; or
  an inter-predicted picture.

12. The method according to claim 9 further comprising determining a motion vector comprises determining at least one of a horizontal motion vector component and a vertical motion vector component for the motion vector;
restricting the vertical motion vector component within a first range [a1,b1]; and
restricting the horizontal motion vector component within a second range [a2,b2].

13. The method according to claim 9 further comprising:
determining that the reference picture is associated with a fixed motion vector component on the basis of at least one of the following:
    decoding an indication from the bitstream that the reference picture is associated with the fixed motion vector component;
    inferring that the reference picture is associated with the fixed motion vector component based on one or more of the following
        a type of the reference picture;
        a scalability layer of the current picture and a scalability layer of the reference picture;
        a view of the current picture and a view of the reference picture; or
        a property of the current picture and/or a property of the reference picture;
    and determining a fixed motion vector component value to be used as the motion vector information relating to the current block.

14. The method according to claim 13, wherein the determining the fixed motion vector component value for the current block comprises inferring the fixed motion vector component value on the basis of the reference type.

15. The method according to claim 9 further comprising:
determining a first entropy coding context and a second entropy coding context;
using the second entropy coding context in decoding motion vectors, when the reference block is selected from a view synthesized picture, an inter-view picture or an inter-layer picture; and
using the first entropy coding context in decoding motion vectors, when the reference block is not selected from the view synthesized picture, the inter-view picture or the inter-layer picture.

16. An apparatus comprising at least one processor and at least one memory including computer program code, the at least one memory and the computer program code configured to, with the at least one processor, cause the apparatus to:
    receive a bit stream comprising encoded information relating to a current block of a frame representing an enhancement layer of the picture;
    construct a reference picture list for the current block, the reference picture list comprising at least a decoded base-layer of the picture for inter-layer prediction, and a decoded enhancement layer picture for inter-prediction;
    decode, from the received information, a reference picture index identifying a reference picture from the reference picture list;
    determine a reference type for the current block based on the reference picture index, wherein the reference type for the current block defines a type of prediction between the current block and a reference block by defining whether the type of prediction is an inter-layer prediction or an inter-view prediction;
    use the reference type to determine how to obtain motion vector information relating to the current block,
    wherein in response to the reference type indicating that the type of prediction between the current block and the reference block is an inter-layer prediction, using the reference type to determine that the motion vector for the current block is set to zero, and the current block is predicted based on the reference block;
    wherein in response to the reference type indicating that the type of prediction between the current block and the reference block is an inter-view prediction, using the reference type to determine that a vertical motion vector component of the motion vector for the current block is set to zero, and wherein a precision of the motion vectors differs based on the reference type;
    obtain the motion vector information; and
    perform a prediction for the current block based on the reference block.

17. A computer program product comprising at least one non-transitory computer-readable storage medium having computer-readable program instructions stored therein with the computer-readable program instructions comprising program instructions arranged to:
    receive a bit stream comprising encoded information relating to a current block of a frame representing an enhancement layer of the picture;
    construct a reference picture list for the current block, the reference picture list comprising at least a decoded base-layer of the picture for inter-layer prediction, and a decoded enhancement layer picture for inter-prediction;
    decode, from the received information, a reference picture index identifying a reference picture from the reference picture list;
    determine a reference type for the current block based on the reference picture index, wherein the reference type for the current block defines a type of prediction between the current block and a reference block by defining whether the type of prediction is an inter-layer prediction or an inter-view prediction;
    use the reference type to determine how to obtain motion vector information relating to the current block,
    wherein in response to the reference type indicating that the type of prediction between the current block and the reference block is an inter-layer prediction, using the reference type to determine that the motion vector for the current block is set to zero, and the current block is predicted based on the reference block,
    wherein in response to the reference type indicating that the type of prediction between the current block and the reference block is an inter-view prediction, using the reference type to determine that a vertical motion vector component of the motion vector for the current block is set to zero, and wherein a precision of the motion vectors differs based on the reference type;
    obtain the motion vector information; and
    perform a prediction for the current block based on the reference block.

18. A computer program product comprising at least one non-transitory computer-readable storage medium having computer-readable program instructions stored therein with the computer-readable program instructions comprising program instructions arranged to:
    select a current block of a frame for encoding an enhancement layer of the picture;
    construct a reference picture list for the current block, the reference picture list comprising at least a decoded base-layer of the picture for inter-layer prediction, and a decoded enhancement layer picture for inter-prediction;

select a reference block for the current block, the reference block selected from a reference picture in the reference picture list;

determine a reference picture index identifying the selected reference picture to which the reference block belongs;

determine a reference type indicating a type of prediction between the current block and the reference block based on the reference picture index, and including determining whether the type of prediction is an inter-layer prediction or an inter-view prediction;

determine a motion vector for the current block on the basis of the reference type, wherein in response to the reference type indicating that the type of prediction between the current block and the reference block is an inter-layer prediction, determining the motion vector comprises setting the motion vector for the current block to zero, wherein a precision of the motion vectors differs based on the reference type, and wherein in response to the reference type indicating that the type of prediction between the current block and the reference block is an inter-view prediction, determining the motion vector comprises setting the motion vector for the current block to zero, and the current block is predicted based on the reference block; and encode motion vector information on the basis of the determined motion vector.

* * * * *